United States Patent
Yabe et al.

(10) Patent No.: US 9,287,759 B2
(45) Date of Patent: Mar. 15, 2016

(54) INDUCTION MOTOR, COMPRESSOR, AIR BLOWER, AND AIR CONDITIONER

(75) Inventors: Koji Yabe, Tokyo (JP); Hayato Yoshino, Tokyo (JP); Takahiro Tsutsumi, Tokyo (JP); Kazuhiko Baba, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 511 days.

(21) Appl. No.: 13/881,439

(22) PCT Filed: Dec. 6, 2010

(86) PCT No.: PCT/JP2010/071804
§ 371 (c)(1),
(2), (4) Date: Apr. 25, 2013

(87) PCT Pub. No.: WO2012/077171
PCT Pub. Date: Jun. 14, 2012

(65) Prior Publication Data
US 2013/0214635 A1    Aug. 22, 2013

(51) Int. Cl.
*H02K 17/16*    (2006.01)
*F04B 35/04*    (2006.01)
(Continued)

(52) U.S. Cl.
CPC ........... *H02K 17/16* (2013.01); *F04B 35/04* (2013.01); *F04B 39/04* (2013.01); *H02K 1/165* (2013.01); *H02K 17/20* (2013.01); *H02K 2213/03* (2013.01)

(58) Field of Classification Search
CPC ......... H02K 1/26; H02K 1/265; H02K 17/16; H02K 17/165
USPC .................... 310/182–183, 197, 210–211, 310/216.069–216.073
See application file for complete search history.

(56) References Cited
U.S. PATENT DOCUMENTS 4,782,260 A * 11/1988 Gandhi ............... H02K 17/185
310/211
4,801,832 A *  1/1989 Neumann ........... H02K 17/205
310/184
(Continued)

FOREIGN PATENT DOCUMENTS

CN    101842967 A     9/2010
JP    14-16460 Y1    10/1939
(Continued)

OTHER PUBLICATIONS

International Search Report of the International Searching Authority mailed Jan. 11, 2011 for the corresponding international application No. PCT/JP2010/071804 (with English translation).

*Primary Examiner* — Quyen Leung
*Assistant Examiner* — Eric Johnson
(74) *Attorney, Agent, or Firm* — Posz Law Group, PLC

(57) ABSTRACT

In an induction motor, when dimensions of respective elements of a rotor slot are defined as TB: a shortest distance between a center side of an inner circumferential slot and an outer circumference of the rotor;

TC: a circumferential width of an innermost circumference of an outer circumferential slot;

TD: a circumferential width of an outermost circumference of the inner circumference slot; and TE: a shortest distance between an end side of the inner circumferential slot and the outer circumference of the rotor, and when dimensions of respective elements of a stator iron core are defined as TF: a width of teeth;

TG: a width of a teeth tip end; and

TH: a width of a slot opening part, the dimensions of the respective elements of the rotor slot and the dimensions of the respective elements of the stator iron core satisfy the following relationships:

$TF/(TG+TH) \times TD/2 \leq TB \leq TD/2$; and $TF/(TG+TH) \times TD/2 \leq TE \leq TD/2$.

9 Claims, 23 Drawing Sheets

(51) Int. Cl.
*H02K 1/16* (2006.01)
*H02K 17/20* (2006.01)
*F04B 39/04* (2006.01)

(56) References Cited

U.S. PATENT DOCUMENTS

| | | | |
|---|---|---|---|
| 4,831,301 A * | 5/1989 | Neumann | H02K 1/16 310/184 |
| 2006/0192457 A1 | 8/2006 | Nakayama et al. | |
| 2010/0247347 A1 | 9/2010 | Yoshino et al. | |
| 2010/0253174 A1 | 10/2010 | Yabe et al. | |

FOREIGN PATENT DOCUMENTS

| | | |
|---|---|---|
| JP | 58-116031 A | 7/1983 |
| JP | 07-298582 A | 11/1995 |
| JP | 09-224358 A | 8/1997 |
| JP | 2000-014105 A | 1/2000 |
| JP | 2006-271187 A | 10/2006 |
| JP | 2008-278642 A | 11/2008 |
| JP | 4672083 B2 | 4/2011 |
| WO | 2009/093345 A1 | 7/2009 |

* cited by examiner

FIG.20
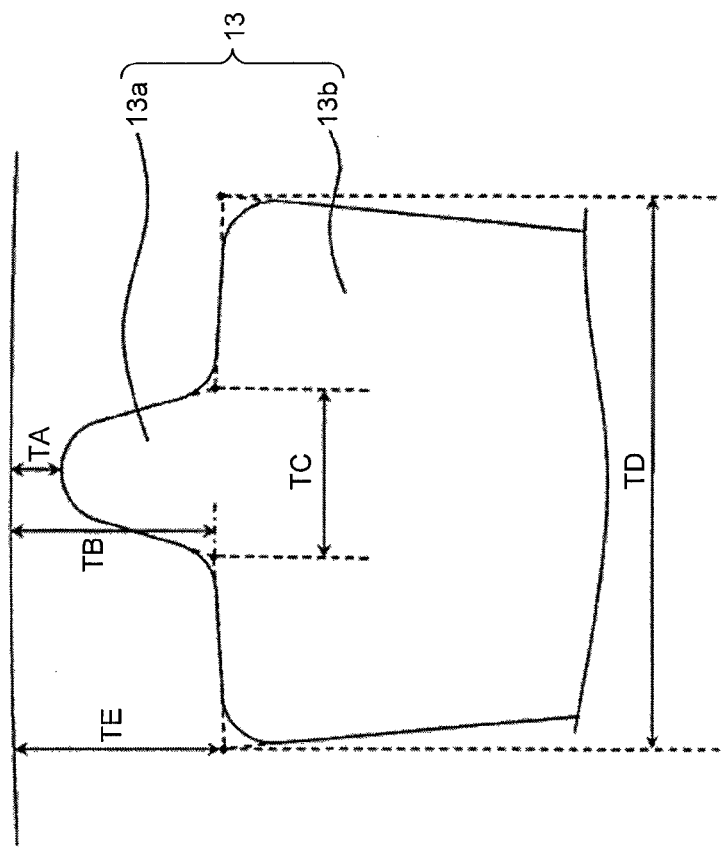
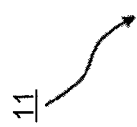

→ FLOW OF REFRIGERANT DURING COOLING OPERATION
----→ FLOW OF REFRIGERANT DURING HEATING OPERATION

INDUCTION MOTOR, COMPRESSOR, AIR BLOWER, AND AIR CONDITIONER

CROSS REFERENCE TO RELATED APPLICATION

This application is a U.S. national stage application of International Patent Application No. PCT/JP2010/071804 filed on Dec. 6, 2010.

TECHNICAL FIELD

The present invention relates to an induction motor and particularly to shapes of a stator iron core and a rotor iron core of an induction motor. The present invention also relates to a compressor and an air blower each of which having the induction motor incorporated therein, and an air conditioner having the compressor and the air blower incorporated therein.

BACKGROUND

Conventionally, for a rotor of an induction motor, there have been proposed many shapes such as shapes of slots and shapes for reducing a power factor, a stray load loss, noise, and the like by providing slits on an outer circumference.

For example, a shape of a rotor is proposed as follows for a high-performance induction motor including a rotor iron core having a plurality of slots and a secondary conductor contained in these slots of the rotor iron core and formed by aluminum die casting. In this induction motor, slits that are not coupled to these slots are provided on a rotor surface side of enclosed slots of the rotor iron core, respectively, and each of these slits is set to have a circumferential dimension in a range from 1.0 millimeter to 3.5 millimeters and a radial dimension in a range from 1.0 millimeter to 2.5 millimeters so as to be able to always reduce its power factor, stray load loss, noise, and the like (see, for example, Patent Literature 1).

CITATION LIST

Patent Literature

Patent Literature 1: Japanese Patent Application Laid-open No. H9-224358

However, the shape of the rotor of an induction motor described in Patent Literature 1 mentioned above has the following problems. That is, because the slits are provided in outer circumferences of the respective enclosed slots, an equivalent air gap widens and it is necessary to manage the air gap and to prevent shapes of end rings from overlapping these slits. This air gap is an air gap (normally several hundreds micrometers) between a stator and a rotor.

SUMMARY

The present invention has been achieved to solve the above problems, and the present invention is to provide an induction motor, a compressor, an air blower, and an air conditioner that can relax the concentration of a secondary current in a secondary conductor of a rotor and can improve motor characteristics.

An induction motor of the present invention includes: a stator; a rotor that is provided inside of the stator via an air gap; and a squirrel-cage secondary conductor that is formed by filling a rotor slot of a rotor iron core of the rotor with a nonmagnetic and conductive material. The rotor slot includes an outer circumferential slot that is formed near an outer circumference of the rotor, and an inner circumferential slot that communicates with the outer circumferential slot and that is formed inside of the outer circumferential slot. The stator includes a stator iron core, and a winding that is inserted into a slot formed in the stator iron core. The stator iron core includes a core back that is formed near an outer circumference of the stator iron core, a plurality of teeth that are formed to extend radially from an inner circumference of the core back in a direction of the rotor, a slot that is formed between two of the adjacent teeth, and a slot opening part that is formed in the slot, and that is open to the air gap. Additionally, when dimensions of respective elements of the rotor slot are defined as follows: TB: a shortest distance between a center side of the inner circumferential slot and the outer circumference of the rotor; TC: a circumferential width of an innermost circumference of the outer circumferential slot; TD: a circumferential width of an outermost circumference of the inner circumferential slot; and TE: a shortest distance between an end side of the inner circumferential slot and the outer circumference of the rotor, and when dimensions of respective elements of the stator iron core are defined as follows: TF: a width of the teeth; TG: a width of a teeth tip end; and TH: a width of a slot opening part, the dimensions of the respective elements of the rotor slot and the dimensions of the respective elements of the stator iron core satisfy relations as follows.

$$TF/(TG+TH) \times TD/2 \leq TB \leq TD/2 \qquad \text{Expression (1)}$$

$$TF/(TG+TH) \times TD/2 \leq TE \leq TD/2 \qquad \text{Expression (2)}$$

With the above configuration, according to the induction motor of the present invention, the concentration of a secondary current in a secondary conductor of a rotor is relaxed and motor characteristics are improved.

BRIEF DESCRIPTION OF DRAWINGS

FIG. 20 is a partial enlarged view of FIG. 19.

DETAILED DESCRIPTION

First Embodiment

Figure 1:
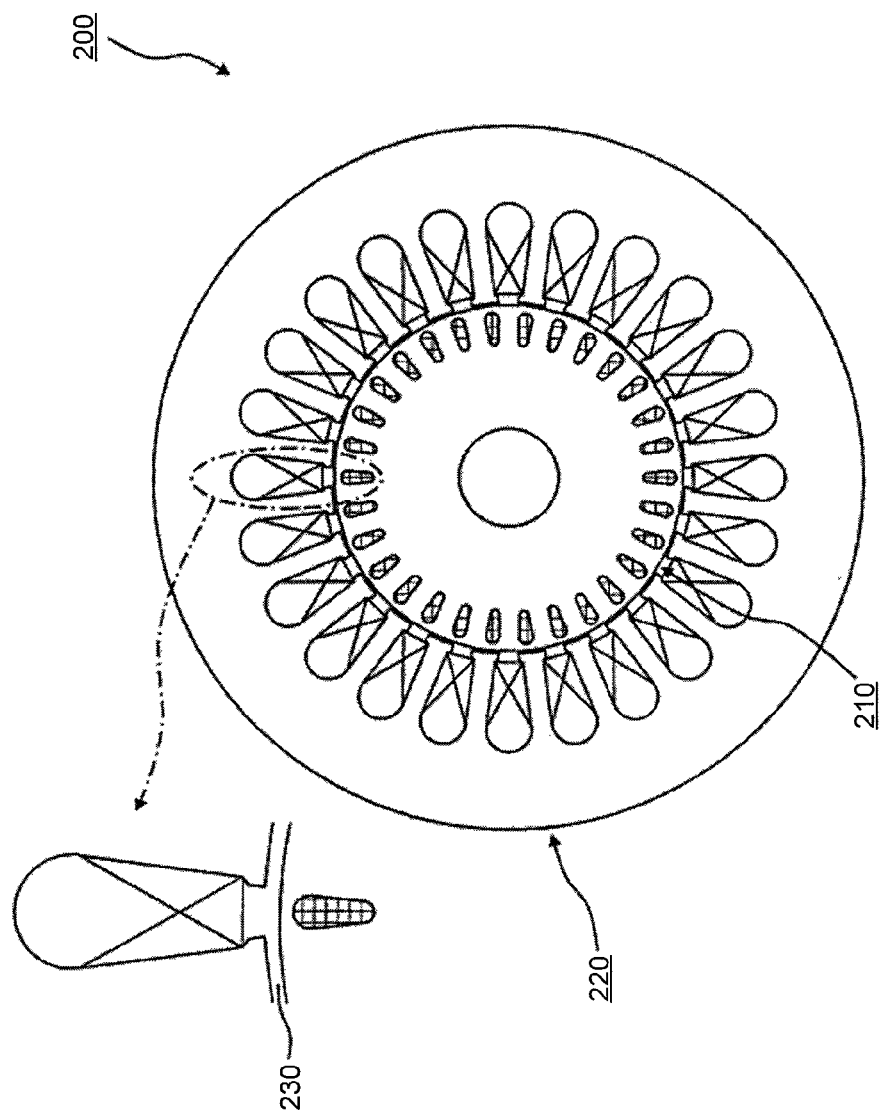
FIG. 1 is shown for a comparison, and is a horizontal cross-sectional view of a general induction motor 200.
Figure 2:
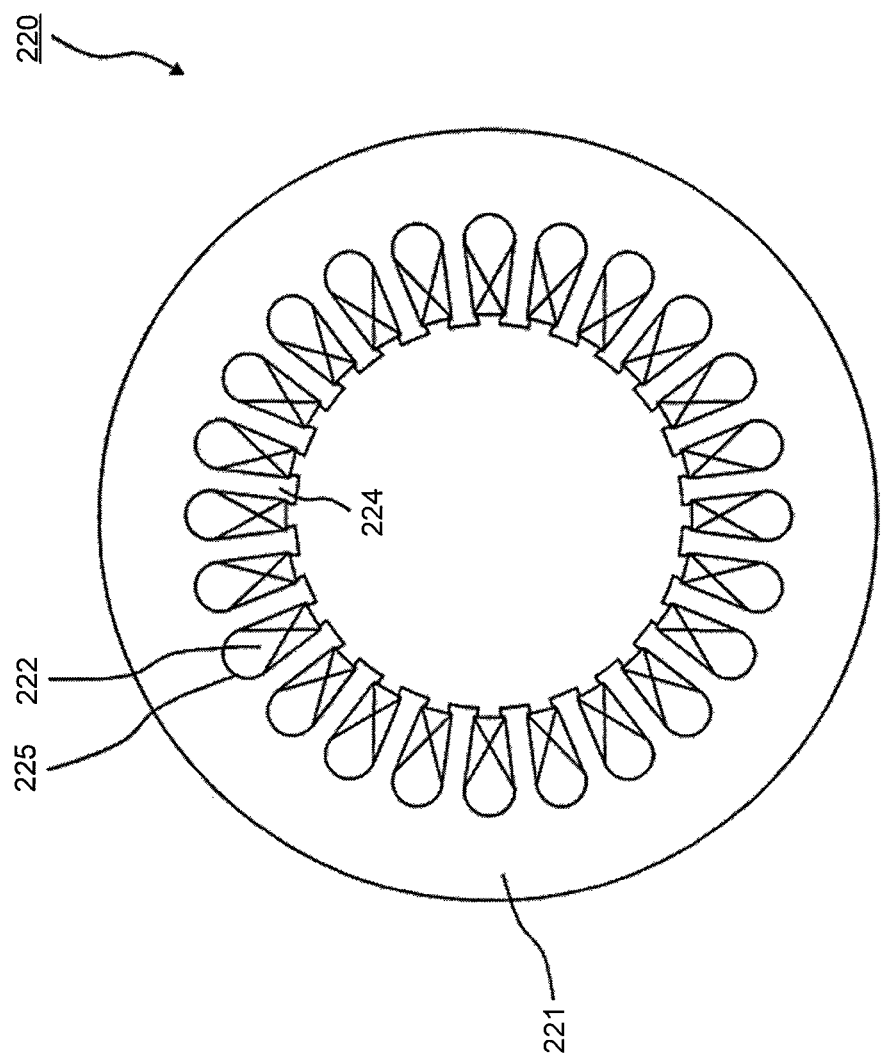
FIG. 2 is shown for a comparison, and is a horizontal cross-sectional view of a stator 220 of the general induction motor 200.
Figure 3:
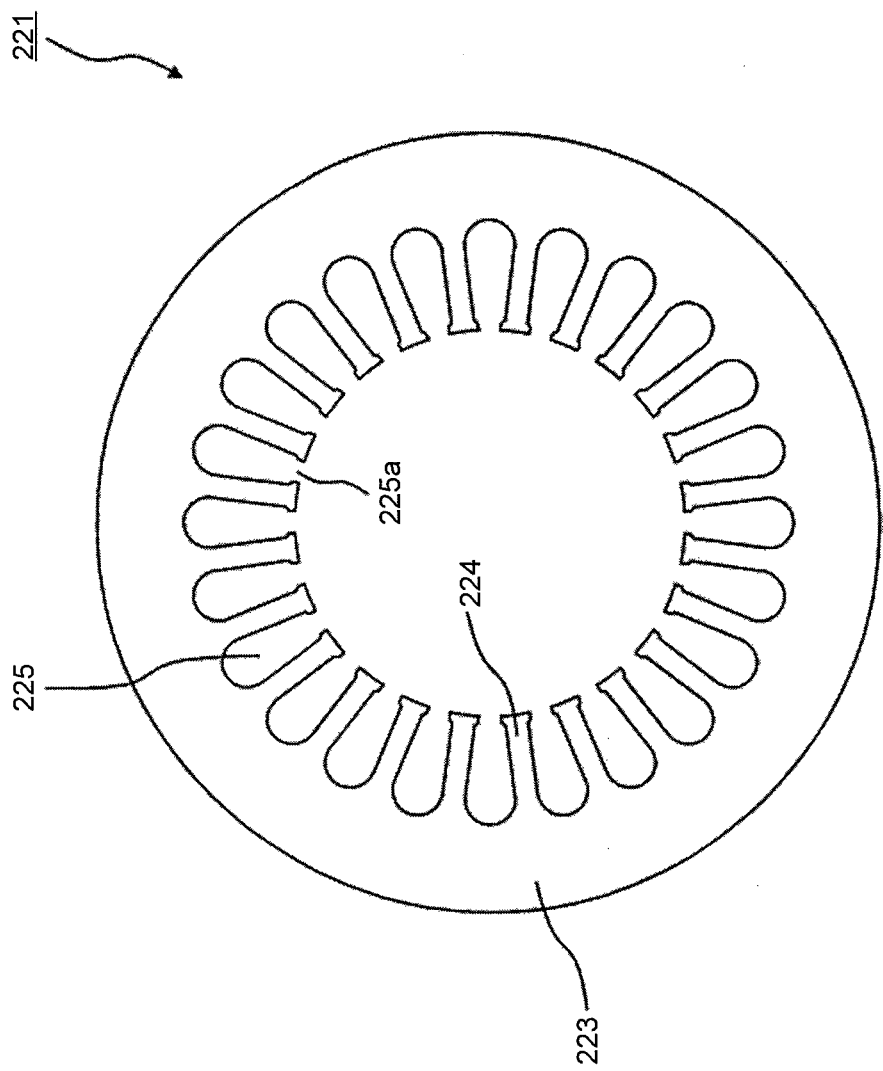
FIG. 3 is shown for a comparison, and is a horizontal cross-sectional view of a stator iron core 221 of the general induction motor 200.

FIGS. 1 to 3 are for shown for comparisons, where FIG. 1 is a horizontal cross-sectional view of a general induction motor 200, FIG. 2 is a horizontal cross-sectional view of a stator 220 of the general induction motor 200, and FIG. 3 is a horizontal cross-sectional view of a stator iron core 221 of the general induction motor 200.

As shown in FIG. 1, the general induction motor 200 (hereinafter, also simply "motor") includes the stator 220 and a rotor 210 arranged inside of the stator 220 via an air gap 230.

As shown in FIG. 2, the stator 220 includes the stator iron core 221 of a generally ring shape and a winding 222 inserted into each of slots 225 formed in the stator iron core 221. The winding 222 is a concentrated winding or a distributed winding wound around each of the teeth 224. The winding 222 is for a single phase or three phases.

The stator iron core 221 is produced by blanking magnetic steel sheets each having a thickness of 0.1 millimeter to 1.5 millimeters into a predetermined shape, stacking a predetermined number of resultant magnetic steel sheets in an axial direction, and fixing the stacked magnetic steel sheets by nipper caulking, welding, and the like.

As shown in FIG. 3, a ring-shaped core back 223 is formed on an outer circumference of the stator iron core 221, and a plurality of teeth 224 (24 teeth in FIG. 3) extend radially from an inner circumference of the core back 223 in a direction of the rotor 210. The teeth 224 are almost constant in circumferential width in a radial direction.

The slot 225 (a space) is formed between two of the adjacent teeth 224. The number of the slots 225 is equal to that of the teeth 224, that is, 24. Because the teeth 224 are almost constant in circumferential width in the radial direction, a circumferential width of each slot 225 gradually increases from the inside (near the rotor 210) toward outside (near the core back 223). The slot 225 is open to the air gap 230 (see FIG. 1) and the opening of the slot 225 is referred to as "slot opening part 225a (a slot opening)". The winding 222 is inserted from the slot opening part 225a.

Figure 4:
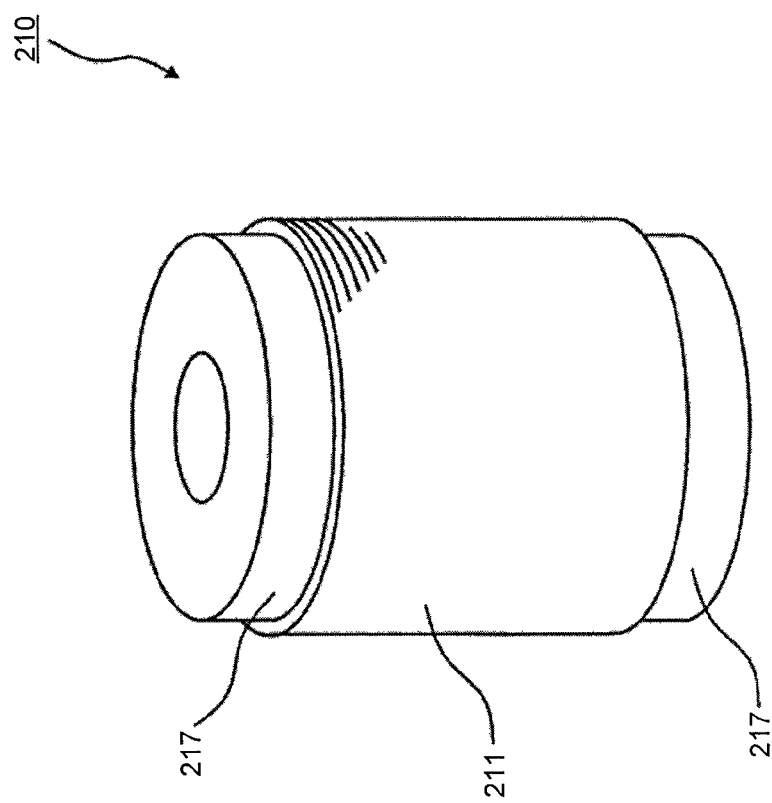
FIG. 4 is shown for a comparison, and is a perspective view of a rotor 210 of the general induction motor 200.
Figure 5:
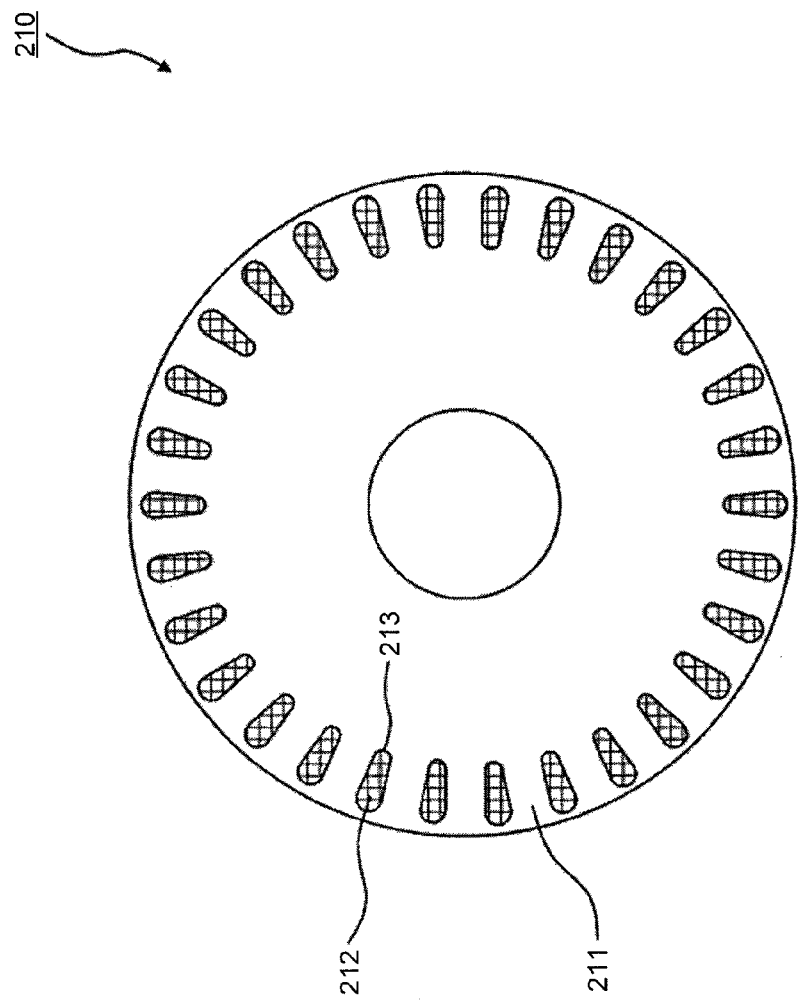
FIG. 5 is shown for a comparison, and is a horizontal cross-sectional view of the rotor 210 of the general induction motor 200.
Figure 6:
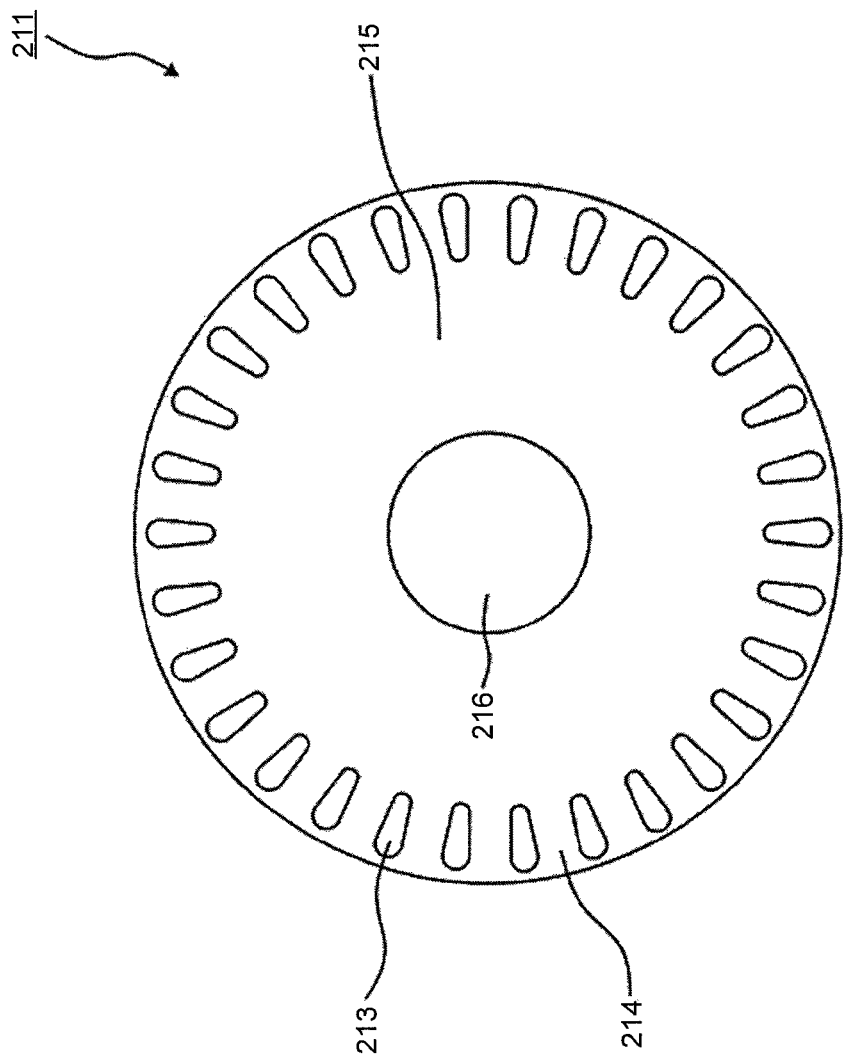
FIG. 6 is shown for a comparison, and is a horizontal cross-sectional view of a rotor iron core 211 of the general induction motor 200.

FIGS. 4 to 6 are for shown for comparisons, where FIG. 4 is a perspective view of the rotor 210 of the general induction motor 200, FIG. 5 is a horizontal cross-sectional view of the rotor 210 of the general induction motor 200, and FIG. 6 is a horizontal cross-sectional view of a rotor iron core 211 of the general induction motor 200.

As shown in FIG. 4, the rotor 210 includes the rotor iron core 211 and a squirrel-cage secondary conductor constituted by an aluminum bar 212 (see FIG. 5) and a pair of end rings 217 formed on both ends of the rotor 210 in a stacking direction, respectively. The aluminum bar 212 and the end rings 217 are produced by simultaneously casting aluminum by die casting. The squirrel-cage secondary conductor is often formed of copper other than aluminum.

As shown in FIG. 5, the aluminum bar 212 of the rotor 210 is formed by casting aluminum into a plurality (30) of rotor slots 213 of the rotor iron core 211. As described above, the aluminum bar 212 and the paired end rings 217 formed on the both ends of the rotor 210 in the stacking direction, respectively constitute the squirrel-cage secondary conductor.

Similarly to the stator iron core 221, the rotor iron core 211 is produced by blanking magnetic steel sheets each having a thickness of 0.1 millimeter to 0.5 millimeter into a predetermined shape, stacking a predetermined number of resultant magnetic steel sheets in the axial direction, and fixing the stacked magnetic steel sheets by nipper caulking, welding, and the like.

As shown in FIG. 6, the rotor iron core 211 has a generally circular cross-section, and a plurality (30) of rotor slots 213 are formed almost equidistantly in a circumferential direction of the rotor iron core 211. The rotor teeth 214 are formed between two of the adjacent rotor slots 213. The number of rotor teeth 214 is equal to that of the rotor slots 213, that is, 30. The rotor teeth 214 are almost constant in circumferential width in a radial direction. Therefore, a circumferential width of the rotor slot 213 gradually increases from the inside toward outside. A shaft hole 216 with which a driving shaft (not shown) is engaged is formed in a central portion of the rotor iron core 211. An iron core portion between the rotor slots 213 and the shaft hole 216 is referred to as "core back 215".

The rotor slots 213 are filled with a nonmagnetic and conductive material (aluminum, for example). Accordingly, when a magnetic flux of the stator 220 is interlinked with each of the rotor slots 213 and the magnetic flux changes, then a secondary current is generated in the aluminum bar 212, and a torque is generated by the secondary current and the magnetic flux from the stator 220.

Ideally, the magnetic flux from the stator 220 does not stride over a part of each of the rotor slots 213 of the rotor 210 but changes suddenly, thereby making the secondary current generated in each rotor slot 213 constant.

Figure 7:
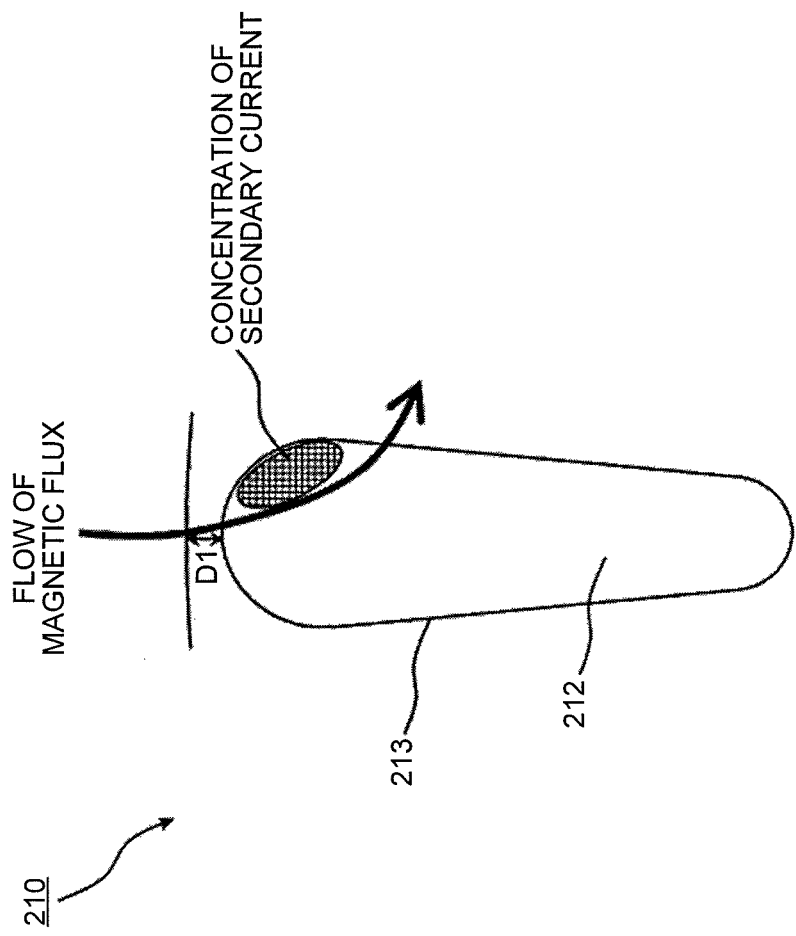
FIG. 7 is shown for a comparison, and depicts a concentrated state of a secondary current generated by interlinkage of a magnetic flux from the stator 220 in the rotor 210 of the general induction motor 200.
Figure 8:
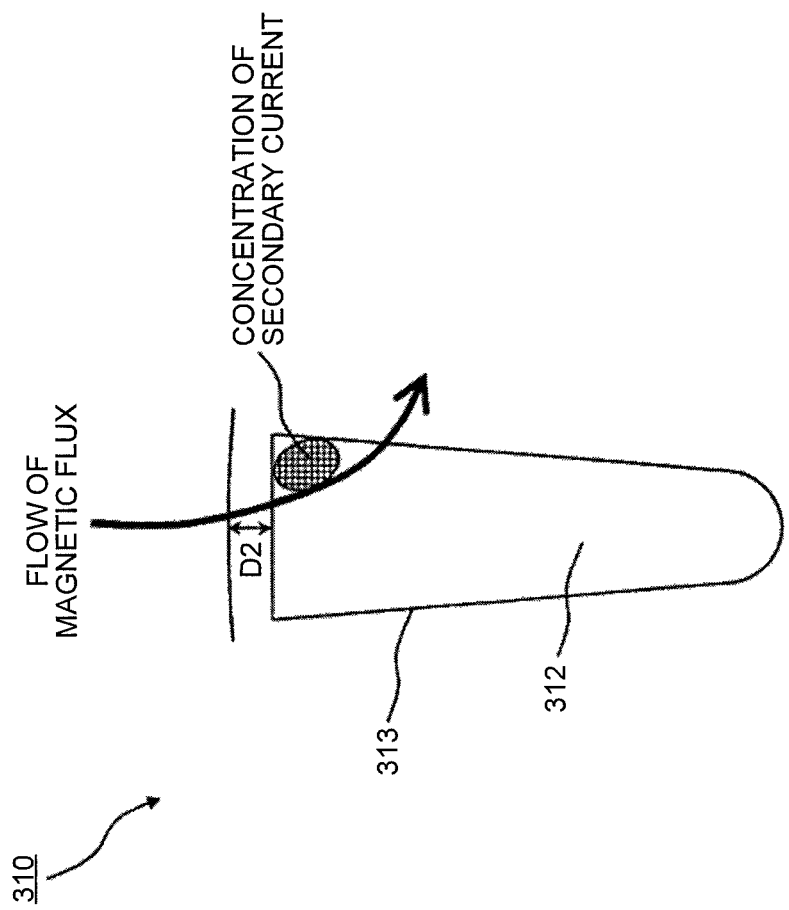
FIG. 8 is shown for a comparison, and depicts a concentrated state of a secondary current generated by interlinkage of a magnetic flux from a stator in another general rotor 310.

FIGS. 7 and 8 are for shown for comparisons, where FIG. 7 depicts a concentrated state of a secondary current generated by interlinkage of a magnetic flux from the stator 220 in the rotor 210 of the general induction motor 200, and FIG. 8 depicts a concentrated state of a secondary current generated by interlinkage of a magnetic flux from a stator in another general rotor 310.

As shown in FIG. 7, in the rotor 210 of the general induction motor 200, because of a small radial width D1 between each of the rotor slots 213 and a rotor outer circumference, the magnetic flux from the stator 220 is interlinked with a part of the rotor slot 213 (near a top of the rotor slot 213 near the outer circumference of the rotor 210 to an upper right corner of the rotor slot 213). An arrow shown in FIG. 7 indicates a flow of the magnetic flux from the stator 220.

The secondary current flows while being concentrated on the part of the rotor slot 213 with which the magnetic flux from the stator 220 is interlinked by the influence of interlinkage of the magnetic flux only in the part of the rotor slot 213. Because of the influence, the general induction motor 200 has problems such that a secondary resistance is high, a secondary copper loss is aggravated, and that the efficiency is degraded, as compared with a case where the secondary current flows in the entire rotor slot 213. This secondary copper loss is also referred to as "stray load loss" or "harmonic secondary copper loss".

Another general rotor 310 shown in FIG. 8 differs from the rotor 210 in the shape of a rotor slot 313. While the rotor slot 213 has a circular arc shape near the outer circumference of the rotor 210, the rotor slot 313 has a flat shape near an outer circumference of the rotor 310. In a case of this rotor 310, similarly to the rotor 210, because of a small radial width D2 between the rotor slot 313 and the outer circumference of the rotor 310, the magnetic flux from the stator is interlinked with a part of the rotor slot 313 (near a center of the rotor slot 313 near the outer circumference of the rotor 310 to an upper right corner of the rotor slot 313). An arrow shown in FIG. 8 indicates a flow of the magnetic flux from the stator. An aluminum bar 312 is cast into the rotor slot 313.

The secondary current flows while being concentrated on the part of the rotor slot 313 with which the magnetic flux from the stator is interlinked by the influence of interlinkage of the magnetic flux only in the part of the rotor slot 313. Because of the influence, another general induction motor has problems such that a secondary resistance is high, a secondary copper loss increases, and that the efficiency is degraded, as compared with a case where the secondary current flows in the entire rotor slot 313.

Figure 9:
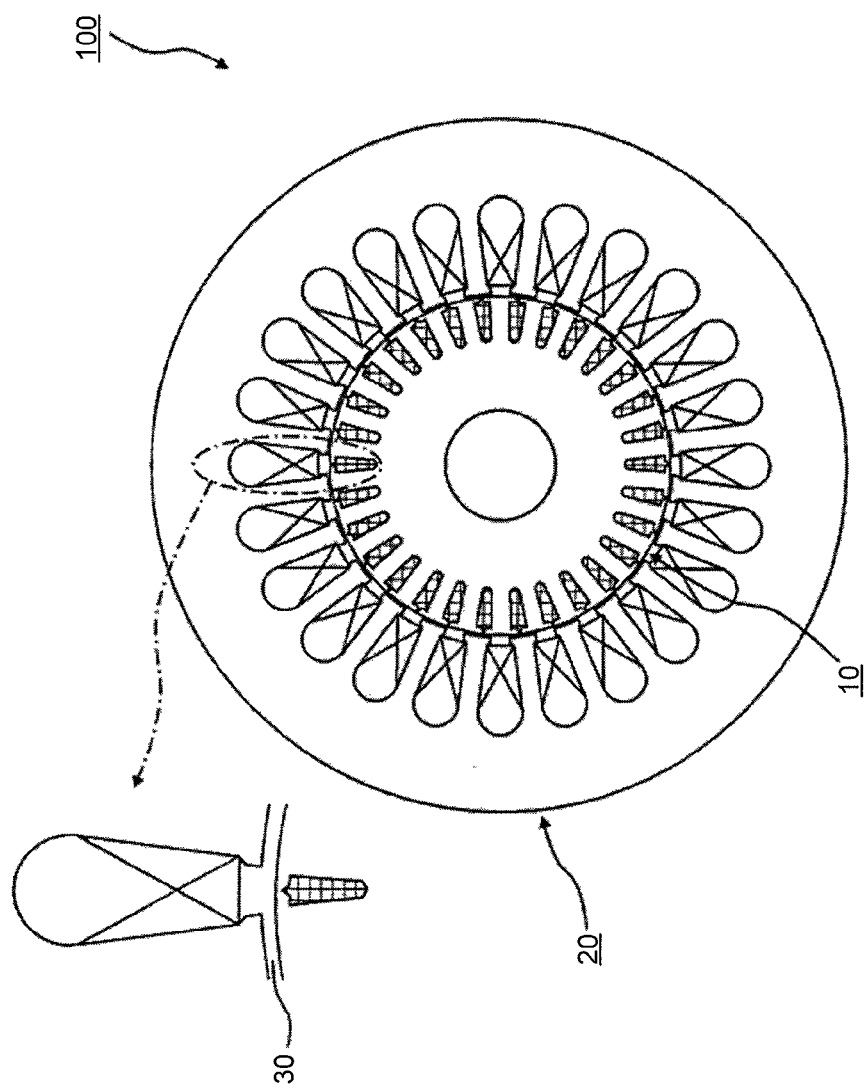
FIG. 9 depicts a first embodiment, and is a horizontal cross-sectional view of an induction motor 100.
Figure 10:
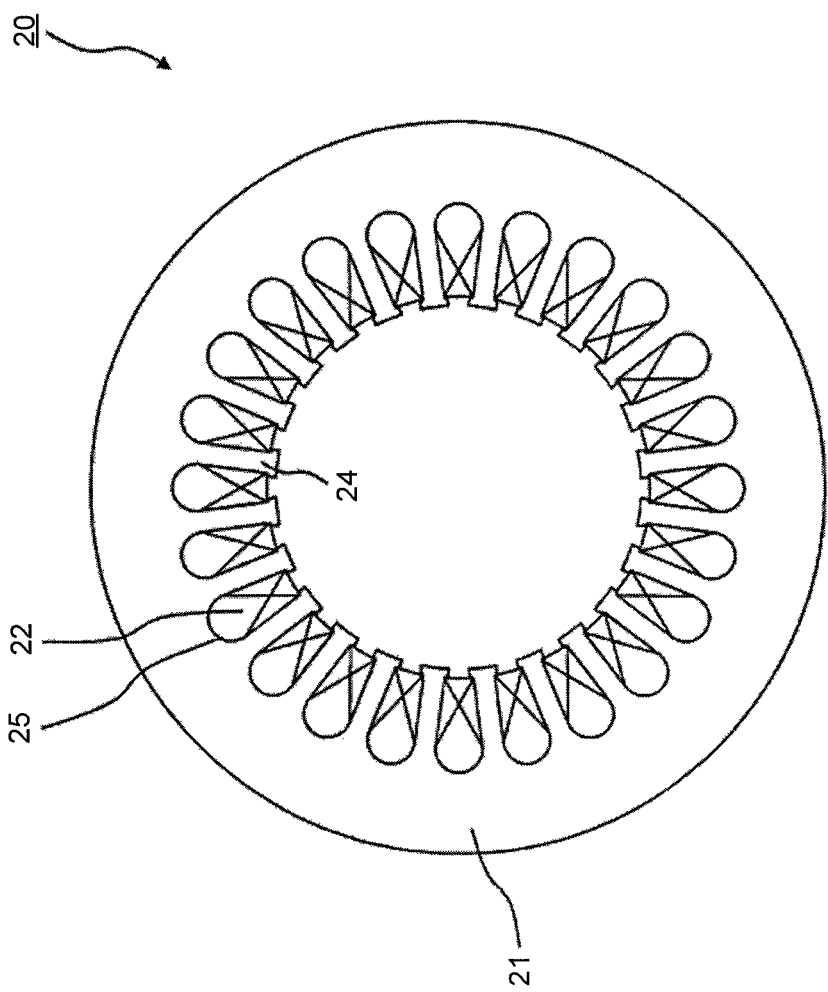
FIG. 10 depicts the first embodiment, and is a horizontal cross-sectional view of a stator 20 of the inductor motor 100.
Figure 11:
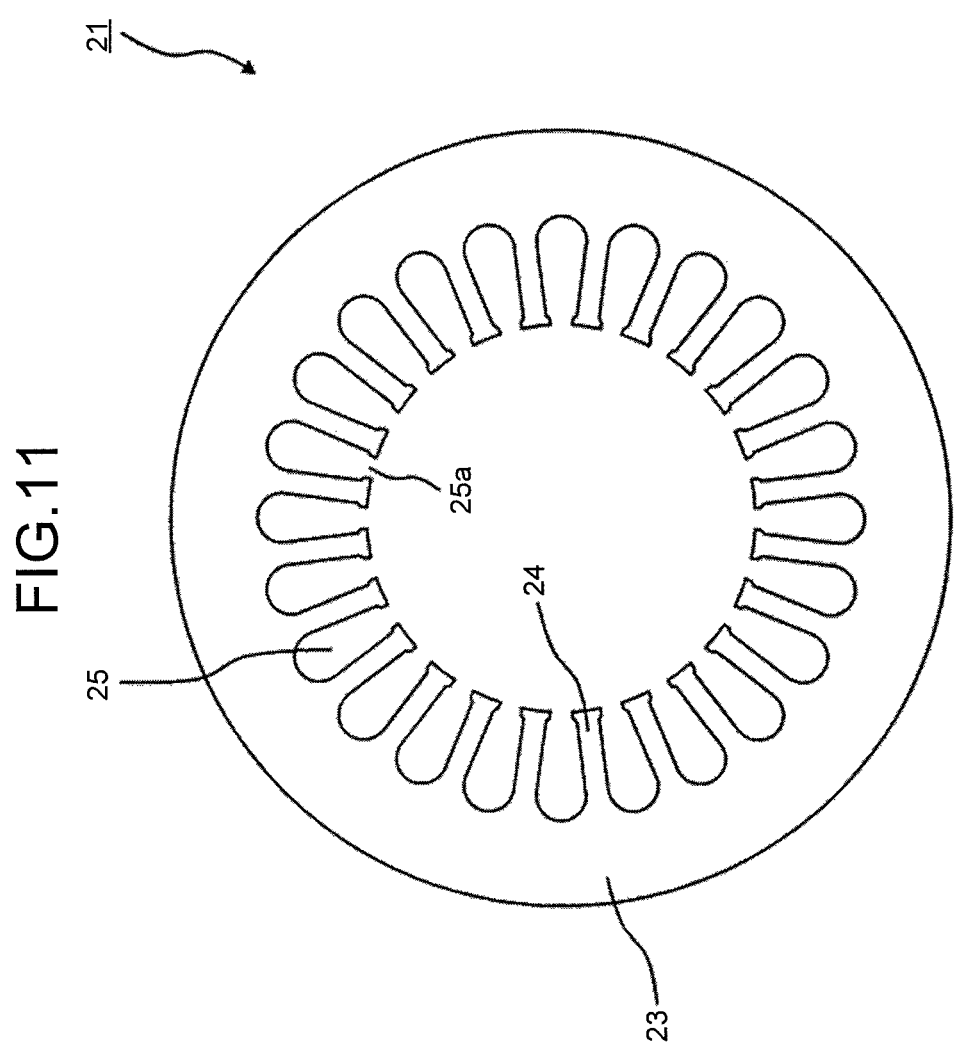
FIG. 11 depicts the first embodiment, and is a horizontal cross-sectional view of a stator iron core 21 of the induction motor 100.
Figure 12:
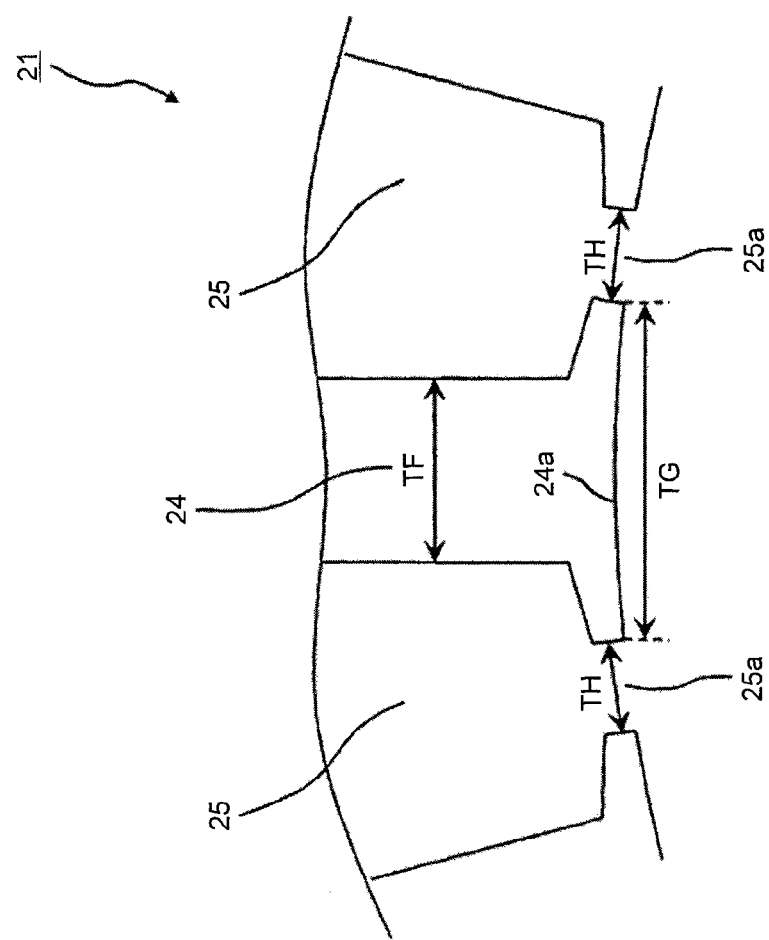
FIG. 12 is a partial enlarged view of FIG. 11.

FIGS. 9 to 14 depict the first embodiment, where FIG. 9 is a horizontal cross-sectional view of an induction motor 100, FIG. 10 is a horizontal cross-sectional view of a stator 20 of the inductor motor 100, FIG. 11 is a horizontal cross-sectional view of a stator iron core 21 of the induction motor 100, and FIG. 12 is a partial enlarged view of FIG. 11.

As shown in FIG. 9, the induction motor 100 according to the present embodiment includes a stator 20 and the rotor 10 arranged inside of the stator 20 via an air gap 30.

As shown in FIG. 10, the stator 20 includes the stator iron core 21 of a generally ring shape and a winding 22 inserted into each of slots 25 formed in the stator iron core 21. The winding 22 is a concentrated winding or a distributed winding wound around respective teeth 24. The winding 22 is for a single phase or three phases.

The stator iron core 21 is produced by blanking a magnetic steel sheet having a thickness of 0.1 millimeter to 1.5 millimeters into a predetermined shape, stacking a predetermined number of resultant scraps in an axial direction, and fixing the stacked scraps by nipper caulking, welding, and the like.

As shown in FIG. 11, a ring-shaped core back 23 is formed on an outer circumference of the stator iron core 21, and a plurality of teeth 24 (24 teeth in FIG. 11) extend radially from an inner circumference of the core back 23 in a direction of the rotor 10. The teeth 224 are almost constant in circumferential width in a radial direction.

The slot 25 (a space) is formed between two of the adjacent teeth 24. The number of slots 25 is equal to that of the teeth 24, that is, 24. Because the teeth 24 are almost constant in circumferential width in the radial direction, a circumferential width of each slot 25 gradually increases from inside (near the rotor 10) toward outside (near the core back 23). The slot 25 is open to the air gap 30 (see FIG. 9) and the opening of the slot 25 is referred to as "slot opening part 25a (a slot opening)". The winding 22 is inserted from the slot opening part 25a.

Dimensions of the respective elements of the stator iron core 21 are defined as shown in FIG. 12.
TF: a width of the teeth 24;
TG: a width of a teeth tip end 24a; and
TH: a width of the slot opening part 25a.

Figure 13:
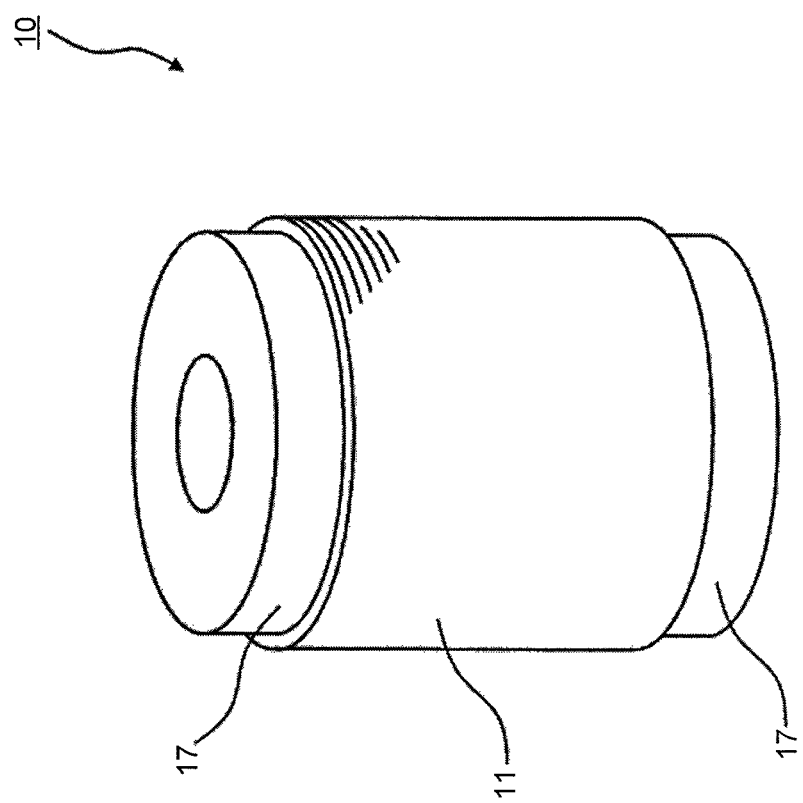
FIG. 13 depicts the first embodiment, and is a perspective view of a rotor 10 of the induction motor 100.
Figure 14:
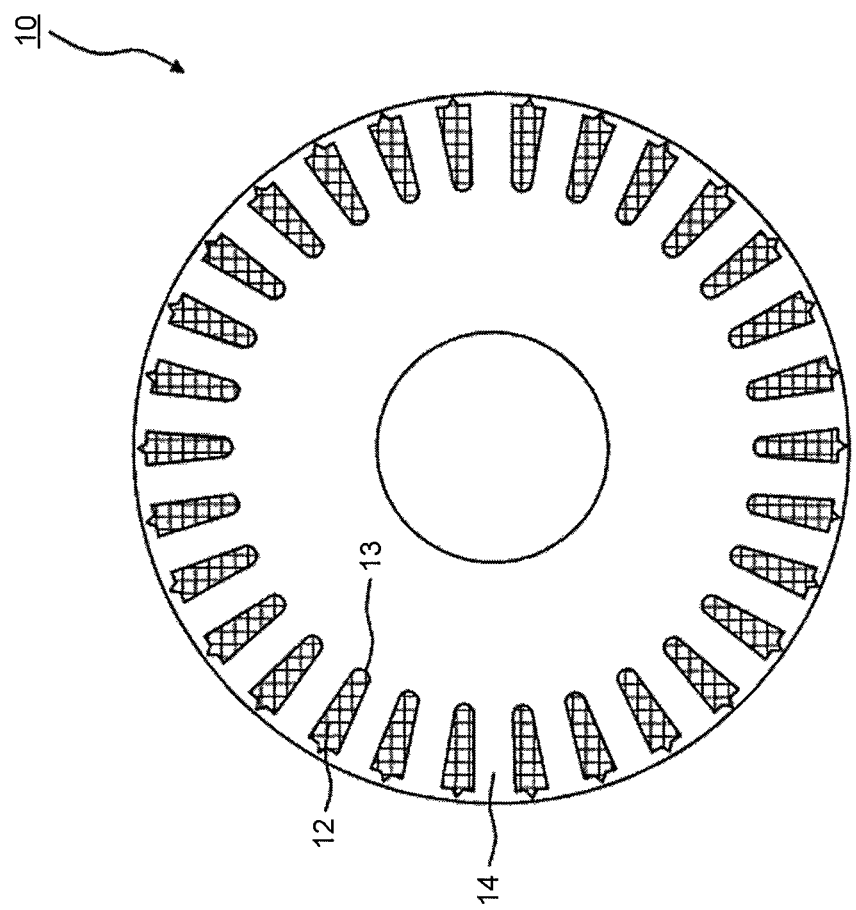
FIG. 14 depicts the first embodiment, and is a horizontal cross-sectional view of the rotor 10 of the induction motor 100.
Figure 15:
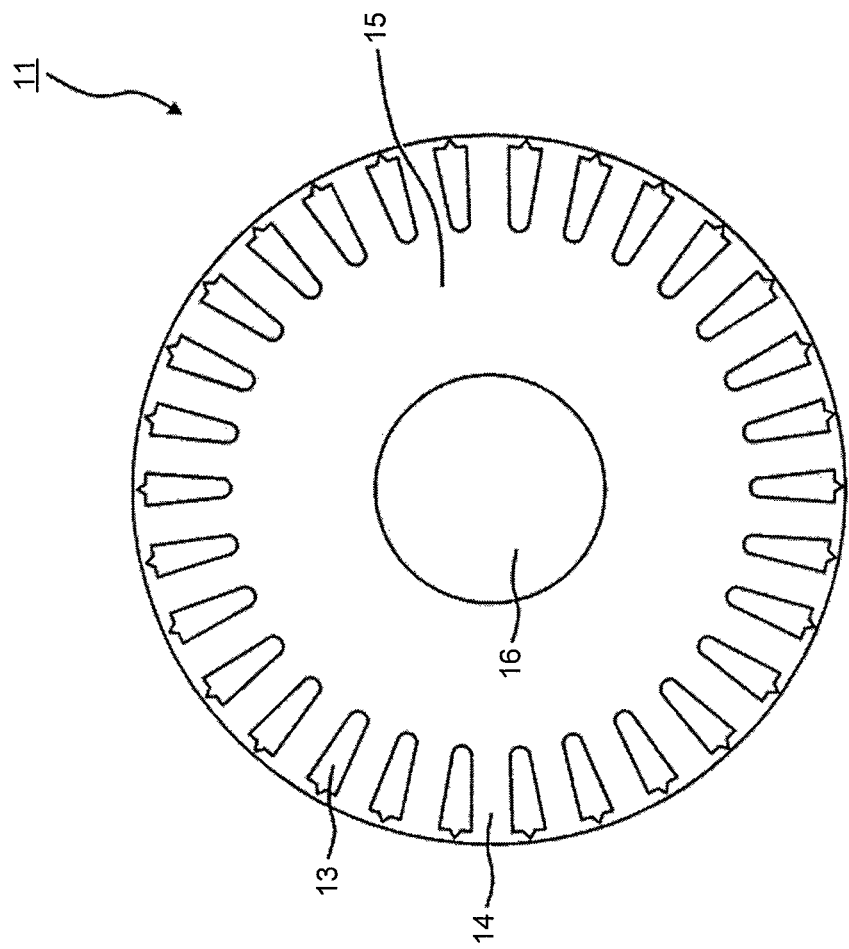
FIG. 15 depicts the first embodiment, and is a horizontal cross-sectional view of a rotor iron core 11 of the induction motor 100.
Figure 16:
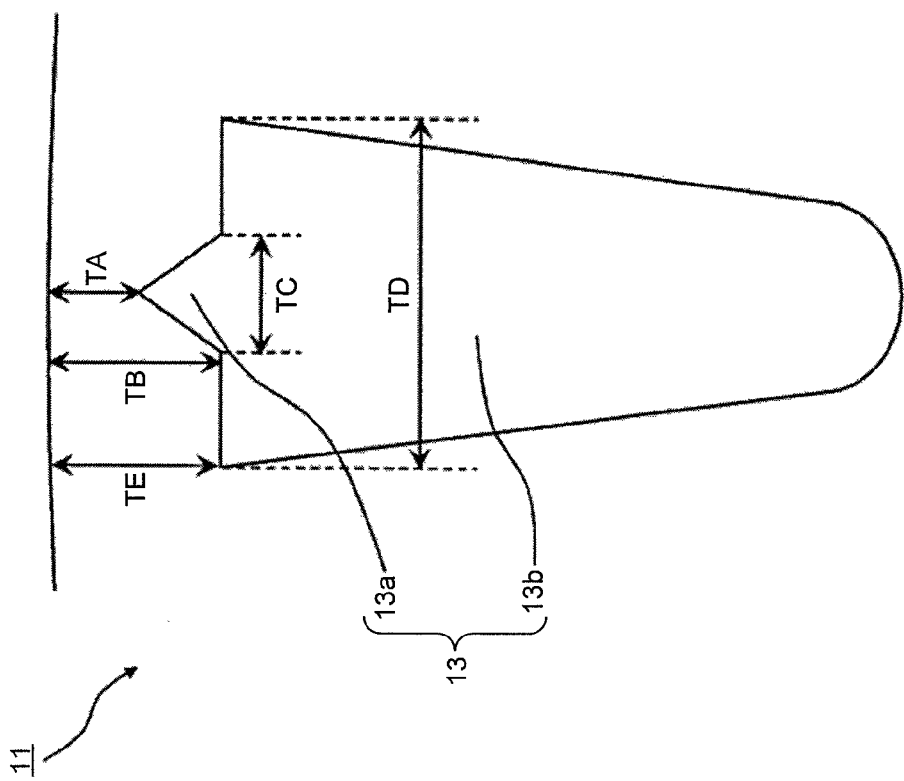
FIG. 16 depicts the first embodiment, and is an enlarged view of a rotor slot 13.

FIGS. 13 to 16 depict the first embodiment, where FIG. 13 is a perspective view of the rotor 10 of the induction motor 100, and FIG. 14 is a horizontal cross-sectional view of the rotor 10 of the induction motor 100. FIG. 15 is a horizontal cross-sectional view of a rotor iron core 11 of the induction motor 100 and FIG. 16 is an enlarged view of a rotor slot 13.

As shown in FIG. 13, the rotor 10 includes the rotor iron core 11 and a squirrel-cage secondary conductor constituted by an aluminum bar 12 (see FIG. 14, a nonmagnetic and conductive material) and a pair of end rings 17 formed on both ends of the rotor 10 in a stacking direction, respectively. The aluminum bar 12 and the end rings 17 are produced by simultaneously casting aluminum by die casting. The squirrel-cage secondary conductor is often formed of copper other than aluminum.

As shown in FIG. 14, the aluminum bar 12 of the rotor 10 is formed by casting aluminum into a plurality (30) of rotor slots 13 of the rotor iron core 11. As described above, the aluminum bar 12 and the paired end rings 17 formed on the both ends of the rotor 10 in the stacking direction, respectively constitute the squirrel-cage secondary conductor.

The rotor iron core 11 is produced by blanking magnetic steel sheets each having a thickness of 0.1 millimeter to 0.5 millimeter into a predetermined shape, stacking a predetermined number of resultant magnetic steel sheets in the axial direction, and fixing the stacked magnetic steel sheets by nipper caulking, welding, and the like.

As shown in FIG. 15, the rotor iron core 11 has a generally circular cross-section, and a plurality (30) of rotor slots 13 are formed almost equidistantly in a circumferential direction of the rotor iron core 11. Rotor teeth 14 are formed between two of the adjacent rotor slots 13. The number of rotor teeth 14 is equal to that of the rotor slots 13, that is, 30. The rotor teeth 14 are almost constant in circumferential width in a radial direction. Therefore, a circumferential width of the rotor slot 13 gradually increases from the inside toward outside. A shaft hole 16 with which a driving shaft (not shown) is engaged is formed in a central portion of the rotor iron core 11. An iron core portion between the rotor slots 13 and the shaft hole 16 is referred to as "core back 15".

As shown in FIG. 16, the rotor slot 13 is constituted by an outer circumferential slot 13a closer to a rotor outer circumference and an inner circumferential slot 13b communicating with the outer circumferential slot 13a and formed inside of the outer circumferential slot 13a. The shape of the outer circumferential slot 13a is a generally triangular shape, and that of the inner circumferential slot 13b resembles that of the rotor slot 313 (see FIG. 8) of the general rotor 310.

Dimensions of the respective elements of the rotor slot 13 are defined as follows.
TA: a shortest distance between the outer circumferential slot 13a and the rotor outer circumference;
TB: a shortest distance between a center side of the inner circumferential slot 13b and the rotor outer circumference;
TC: a circumferential width of an innermost circumference of the outer circumferential slot 13a;
TD: a circumferential width of an outermost circumference of the inner circumferential slot 13b; and
TE: a shortest distance between an end side of the inner circumferential slot 13b and the rotor outer circumference.

A relation between the dimensions of the respective elements of the rotor slot 13 and those of the respective elements of the stator iron core 21 is set as represented by the following Expressions (1) and (2).

$$TF/(TG+TH) \times TD/2 \leq TB \leq TD/2 \qquad \text{Expression (1)}$$

$$TF/(TG+TH) \times TD/2 \leq TE \leq TD/2 \qquad \text{Expression (2)}$$

Therefore, it is possible to reduce the magnetic flux glancing off each rotor slot 13, to avoid the concentration of a secondary current, and to effectively reduce the secondary copper loss. Explanations are given below in relation to this principle. Refer to FIG. 12 for the TF, the TG, and the TH.

First, the reason the magnetic flux from the stator 20 flows in such a manner to glance off each rotor slot 13 is described. Normally, each rotor slot 13 is filled with a nonmagnetic body (aluminum, for example). Accordingly, the magnetic flux passes through the rotor iron core 11 that is a part having a high permeability. However, when the part through which the magnetic flux passes magnetically saturates and the permeability of the part falls, the magnetic flux glances off the rotor slot 13.

When the part is prevented from magnetically saturating by the magnetic flux from the stator 20, the magnetic flux glancing off each rotor slot 13 is not generated. Expressions (1) and (2) are relational expressions to prevent the part from magnetically saturating by the magnetic flux from the stator 20. The respective relational expressions are described below.

Expressions (1) and (2) are those representing a state where a magnetic flux density of a thin portion (a portion of the dimension TB to TE) of the rotor iron core 11 is lower than that of each of the teeth 24 of the stator iron core 21.

TF/(TG+TH)×TD/2 in Expressions (1) and (2) corresponds to a state where the dispersion of the magnetic flux generated from the teeth 24 of the stator 20 is the highest.

When the spread of the magnetic flux generated from the teeth 24 of the stator 20 is the widest, the magnetic flux spreads from a center of one slot opening part 25a to a center of the adjacent slot opening part 25a. That is, the magnetic flux generated from the teeth 24 spreads in a range of a width (TG+TH) because the range has the width TG of the teeth tip end 24a and two halves TH/2 of the width of the slot opening part 25a present per respective teeth 24.

When it is assumed that the magnetic flux density of the teeth 24 is B and an accumulated thickness of the induction motor 100 is L, a magnetic flux amount of one teeth 24 is B×TF×L. The magnetic flux in this magnetic flux amount B×TF×L spreads to the width (TG+TH). A width of a one-side thin portion (a portion of the dimensions TA, TB, to TE) of the rotor iron core 11 is TD/2. Therefore, a magnetic flux amount of the magnetic flux that enters the one-side thin portion (a portion of the dimensions TA, TB, and TE) is obtained as follows.

$$B \times TF \times L/(TG+TH) \times TD/2$$

A process of obtaining a magnetic flux density of the one-side thin portion (a portion of dimensions TB to TE) of the rotor iron core 11 at this time is described. A magnetic flux density of the center side of the inner circumferential slot 13b is as follows.

$$B \times TF \times L/(TG+TH) \times TD/2/L/TB$$

A magnetic flux density of the end side of the inner circumferential slot 13b is as follows.

$$B \times TF \times L/(TG+TH) \times TD/2/L/TE$$

That is, to prevent the magnetic flux density of the one-side thin portion (the portion of the dimensions TB to TE) of the rotor iron core 11 from exceeding the magnetic flux density B of the teeth 24, it suffices to set the TB and the TE to be equal to or larger than TF/(TG+TH)×TD/2.

TD/2 in Expressions (1) and (2) is described. TD/2 indicates a state of the highest concentration of the magnetic flux generated from the teeth 24 of the stator 20.

The state of the highest concentration of the magnetic flux corresponds to a case where the magnetic flux from the teeth 24 does not spread on the teeth tip end 24a. When it is assumed that the magnetic flux density of the teeth 24 is B and that the accumulated thickness of the induction motor 100 is L, the magnetic flux amount of one teeth 24 is B×TF×L.

Furthermore, the magnetic flux from the teeth 24 does not spread on the teeth tip end 24a and the circumferential width of the one-side thin portion (the portion of the dimensions TA, TB, and TE) of the rotor iron core 11 is TD/2. Therefore, the magnetic flux amount of the magnetic flux that enters the one-side thin portion (the portion of the dimensions TA, TB, and TE) of the rotor iron core 11 is obtained as follows.

$$B \times TF \times L/TF \times TD/2$$

That is, $$B \times L \times TD/2.$$

A process of obtaining a magnetic flux density of the one-side thin portion (the portion of dimensions TB to TE) of the rotor iron core 11 at this time is described. The magnetic flux density of the center side of the inner circumferential slot 13b is as follows.

$$B \times L \times TD/2/L/TB$$

The magnetic flux density of the end side of the inner circumferential slot 13b is as follows.

$$B \times L \times TD/2/L/TE$$

That is, to make the magnetic flux density of the one-side thin portion (the portion of the dimensions TB to TE) of the rotor iron core 11 equal to B, it suffices to set the TB and the TE to be equal to TD/2.

Furthermore, this state indicates a state where the magnetic flux does not spread on the teeth tip end 24a but enters the one-side thin portion (the portion of the dimensions TA, TB, and TE) of the rotor iron core 11. No more magnetic flux enters the one-side thin portion (the portion of the dimensions TA, TB, and TE) of the rotor iron core 11. Accordingly, when the dimension of each of the TB and the TE is set to be larger than TD/2, it is possible to reduce the magnetic flux density of the one-side thin portion (the portion of the dimensions TB to TE) of the rotor iron core 11 but the area of the rotor slot 13 also decreases. As a result, the secondary resistance increases, resulting in an increase in the secondary copper loss. Accordingly, each of the TB and the TE is up to TD/2. Alternatively, each of the TB and the TE can be set smaller than TD/2.

That is, by satisfying the relation represented by Expressions (1) and (2), it is possible to set the magnetic flux density of the one-side thin portion (the portion of the dimensions TB to TE) of the rotor iron core 11 to be equal to or lower than the magnetic flux density of the teeth 24 of the stator iron core 21.

$$TF/(TG+TH) \times TD/2 \leq TB \leq TD/2 \qquad \text{Expression (1)}$$

$$TF/(TG+TH) \times TD/2 \leq TE \leq TD/2 \qquad \text{Expression (2)}$$

Furthermore, by setting each of the TB and the TE up to TD/2, it is possible to suppress the magnetic flux density of the one-side thin portion (the portion of the dimensions TB to TE) of the rotor iron core 11 from being set excessively low and to suppress the aggravation of the secondary copper loss.

Figure 17:
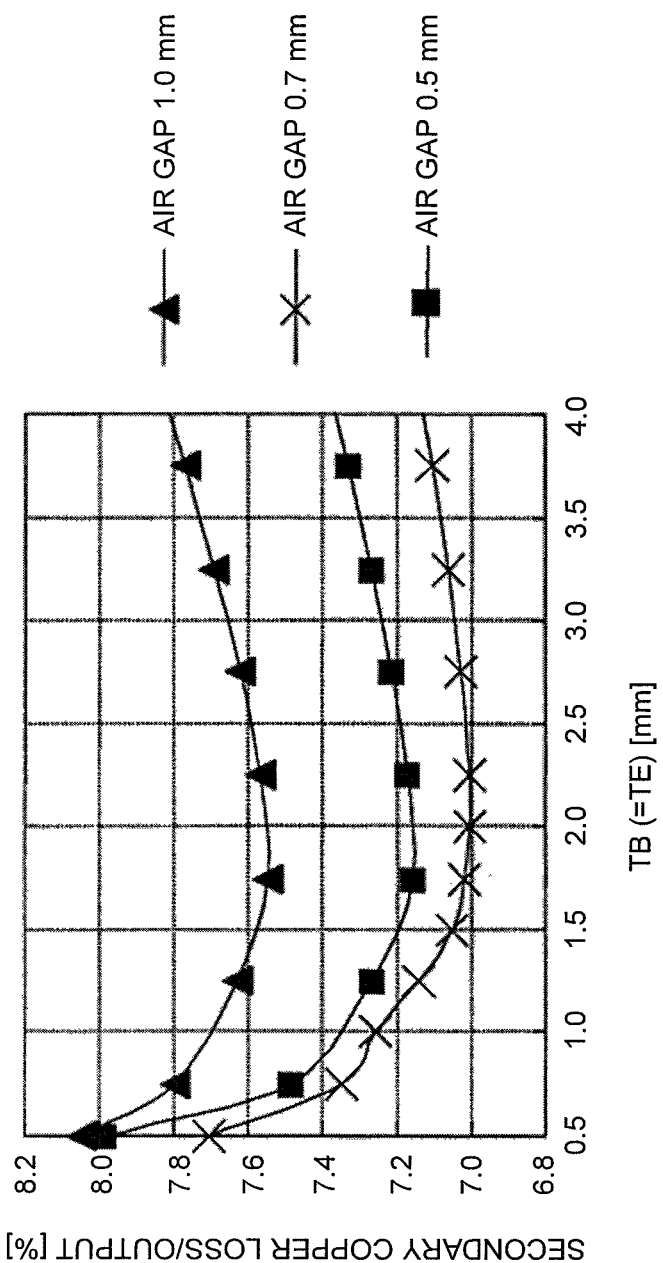
FIG. 17 depicts the first embodiment, and depicts characteristics of secondary copper loss/output [%] to TB (=TE).
Figure 18:
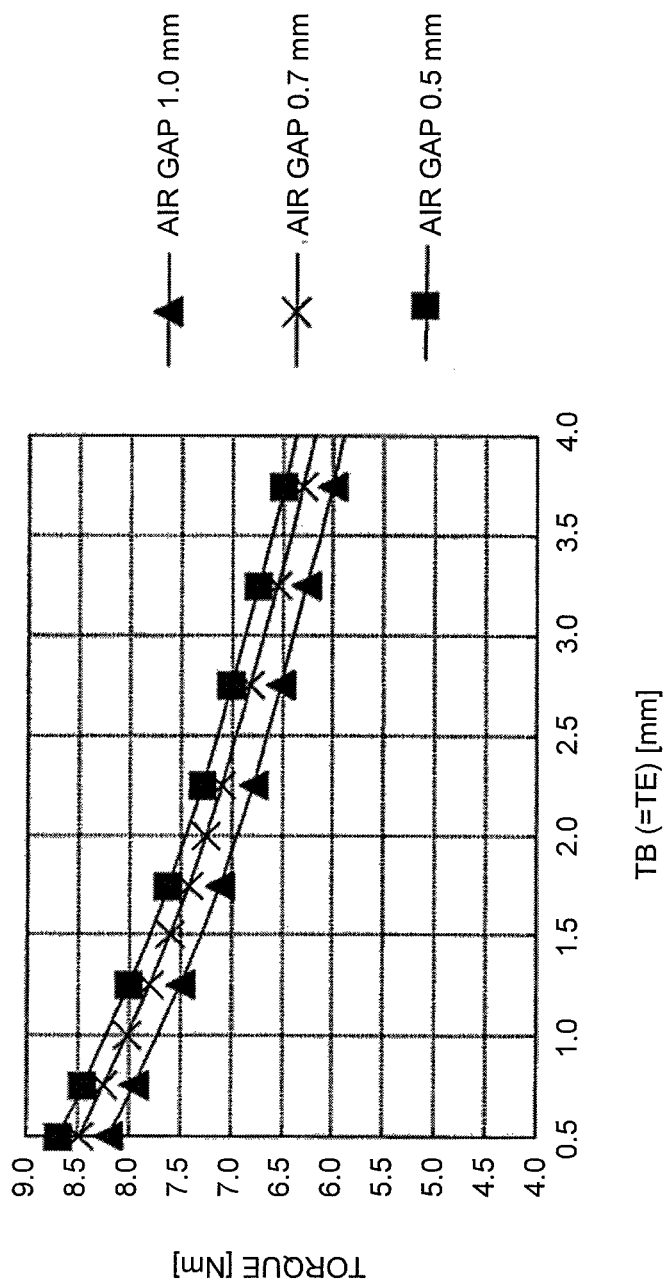
FIG. 18 depicts the first embodiment, and depicts characteristics of a torque to the TB (=TE).

FIGS. 17 and 18 depict the first embodiment, FIG. 17 depicts characteristics of secondary copper loss/output [%] to the TB (=TE), and FIG. 18 depicts characteristics of the torque to the TB (=TE).

FIG. 17 depicts the characteristics of the secondary copper loss/output [%] to the TB (=TE), and FIG. 18 depicts the characteristics of the torque to the TB (=TE) while a voltage, a frequency, and the number of revolutions are assumed to be constant and the air gap is set to 0.5 millimeter, 0.7 millimeter, and 1.0 millimeter. It can be confirmed from the characteristics of the secondary copper loss/output [%] to the TB (=TE) shown in FIG. 17 that a ratio of the secondary copper loss to the output changes as follows when changing the TB.

It can be confirmed from FIG. 17 that the secondary copper loss/output [%] rapidly decreases when the TB is increased from 0.5 millimeter. This indicates that the increased TB can reduce the concentration of the secondary current after the magnetic flux from the stator 20 glances off the rotor slot 13. Furthermore, the secondary copper loss/output [%] gently decreases when the TB is near 1.0 millimeter, reaches a bottom when the TB is 1.5 millimeters to 2.0 millimeters, and gently increases thereafter. It can be also confirmed from FIG. 17 that this trend does not greatly change even when the air gap (the air gap 30) is changed in a range from 0.5 millimeter to 1.0 millimeter.

Furthermore, it can be confirmed from FIG. 18 that the torque decreases when increasing the TB. This is because the slot area decreases and the secondary resistance increases by increasing the TB.

A slip of the induction motor tends to increase (the number of revolutions thereof tends to decrease) at a maximum torque (a stalling torque) when the secondary resistance increases. Accordingly, in an analysis with the number of revolutions set constant, the torque decreases when the secondary resistance increases.

It is desirable not to use the TB and the TE set to be near 0.5 millimeter at which the secondary copper loss/output rapidly increases. The torque decreases when the TB and the TE are set excessively long. Therefore, it is preferable to use the TB and the TE set in the ranges expressed by Expressions (1) and (2), respectively. An example of numerical values of the TB and the TE is shown below.

The dimensions calculated in the present embodiment are as follows.

The width of the teeth 24 TF=4 mm
The width of the teeth tip end 24a TG=6 mm
The width of the slot opening part 25a TH=3 mm
The circumferential width of the outermost circumference of the inner circumference slot 13b TD=4 mm When the above numerical values are assigned to Expressions (1) and (2), the TB and the TE are expressed as follows.

$$0.89 \leq TB \leq 2$$

$$0.89 \leq TE \leq 2$$

A lower limit value of each of the TB and the TE is 0.89 millimeter, which corresponds to a portion in which the TB or the TE is away from near 0.5 millimeter and in which the secondary copper loss/output is gentle. Furthermore, an upper limit value thereof is 2 millimeters, which is near the bottom of the secondary copper loss/output. Based on the above facts, it is possible to reduce the secondary copper loss/output and also possible to suppress the torque from decreasing by setting the TB and the TE to fall in the ranges represented by Expressions (1) and (2), respectively.

Furthermore, portions of the magnetic steel sheets that are not used effectively are present when the TB is longer than the TE, depending on the flow of the magnetic flux from the stator 20. Therefore, the shortest distance TB between the center side of the inner circumferential slot 13b and the rotor outer circumference and the shortest distance TE between the end side of the inner circumferential slot 13b and the rotor outer circumference preferably satisfy a relation of TB≤TE.

Further, by setting the shortest distance TA between the outer circumferential slot 13a and the rotor outer circumference to be smaller than the thickness T of each of the magnetic steel sheets that constitute the rotor iron core 11, it is possible to reduce leakage of the magnetic flux from between the rotor slot 13 and the rotor outer circumference, to effectively use the magnetic flux, and to effectively improve the output and the efficiency. These effects are described below.

Generally, the shortest distance TA between the outer circumferential slot 13a and the rotor outer circumference is often set as short as possible. This is intended to reduce the magnetic flux that passes between the rotor slot 13 and the rotor outer circumference and that is not interlinked with the rotor slot 13 as much as possible, and to effectively use the magnetic flux from the stator 20.

However, in a case of the general rotor slots 213 and 313 shown in FIGS. 7 and 8, when the radial width D1 or D2 between the rotor slot 213 or 313 and the rotor outer circumference is reduced, the magnetic flux from the stator glances off the rotor slot 213 or 313 because a circumferential width therebetween is also large. Accordingly, the secondary copper loss is disadvantageously aggravated although the magnetic flux can be effectively used.

Besides, in the case of the rotor slot 13 (having the shape shown in FIG. 16) according to the present embodiment, even when the shortest distance TA between the outer circumferential slot 13a and the rotor outer circumference is reduced, the magnetic flux from the stator 20 does not glance off the rotor slot 13 but can be effectively used.

Furthermore, by setting the shortest distance TA between the outer circumferential slot 13a and the rotor outer circumference to be smaller than the thickness T of each of the magnetic steel sheets that constitutes the rotor iron core 11, the magnetic characteristics of the radial thin portion between the outer circumferential slot 13a and the outer circumference are degraded by blanking distortion.

When the magnetic characteristics of the radial thin portion between the outer circumferential slot 13a and the rotor outer circumference are degraded, the saturation magnetic flux density decreases. Therefore, it is possible to reduce the magnetic flux that passes between the outer circumferential slot 13a and the rotor outer circumference and that is not interlinked with the rotor slot 13.

In the case of the general rotor slots 213 and 313 (FIGS. 7 and 8), the secondary copper loss is aggravated because the circumferential width is also large and the magnetic flux from the stator glances off the rotor slot 213 or 313. In the case of the rotor slot 13 (see FIG. 16) according to the present embodiment, it is possible to prevent the magnetic flux from the stator 20 from glancing off the rotor slot 13 and to reduce the aggravation of the secondary copper loss.

As shown in FIG. 16, the rotor slot 13 according to the present embodiment is constituted by the outer circumferential slot 13a closer to the rotor outer circumference and the inner circumferential slot 13b communicating with the outer circumferential slot 13a and formed inside of the outer circumferential slot 13a. Furthermore, the circumferential width TC of the innermost circumference of the outer circumferential slot 13a is smaller than the circumferential width TD of the outermost circumference of the inner circumferential slot 13b, and the circumferential width of the outer circumferential slot 13a is smaller as the outer circumferential slot 13a approaches to the rotor outer circumference. The slots near the rotor outer circumference are thereby made small.

Because the secondary current flowing in each of the slots is concentrated on neighborhoods of the rotor outer circumference and the slots near the rotor outer circumference are small, it is possible to reduce the size of a secondary-current concentrated portion, to reduce the secondary copper loss, and to improve the motor efficiency.

Furthermore, the circumferential width TC of the innermost circumference of the outer circumferential slot 13a is set to be 1.5 times or more as large as the thickness T (0.1 millimeter to 1.5 millimeters) of the magnetic steel sheet in view of the blanking characteristics of a metal mold. In addition, by setting the circumferential width TC of the innermost circumference to be 1.5 times or more as large as the thickness T (0.1 millimeter to 1.5 millimeters) of the magnetic steel sheet, it is possible to set the circumferential width of the outer circumferential slot 13a to be gradually smaller as the outer circumferential slot 13a approaches to the rotor outer circumference.

Further, the outer circumferential slot 13a can prevent the magnetic flux from the stator 20 from flowing in such a manner as to glance off the rotor slot 13. Accordingly, the circumferential width TD of the outermost circumference of the inner circumferential slot 13b is set to be larger than the circumferential width TC of the innermost circumference of the outer circumferential slot 13a so as to increase an area of the inner circumferential slot 13b. When the area of the inner circumferential slot 13b increases, then the secondary resistance decreases and the motor efficiency is improved.

Furthermore, the rotor slot 13 according to the present embodiment has the following effects. Because of the small outer circumferential slot 13a as compared with the general rotor slot, a thin portion between the rotor slot 13 and the rotor outer circumference is made thinner, the blanking characteristics of the metal mold are improved, and the maintenance and life of the metal mold are improved.

Figure 19:
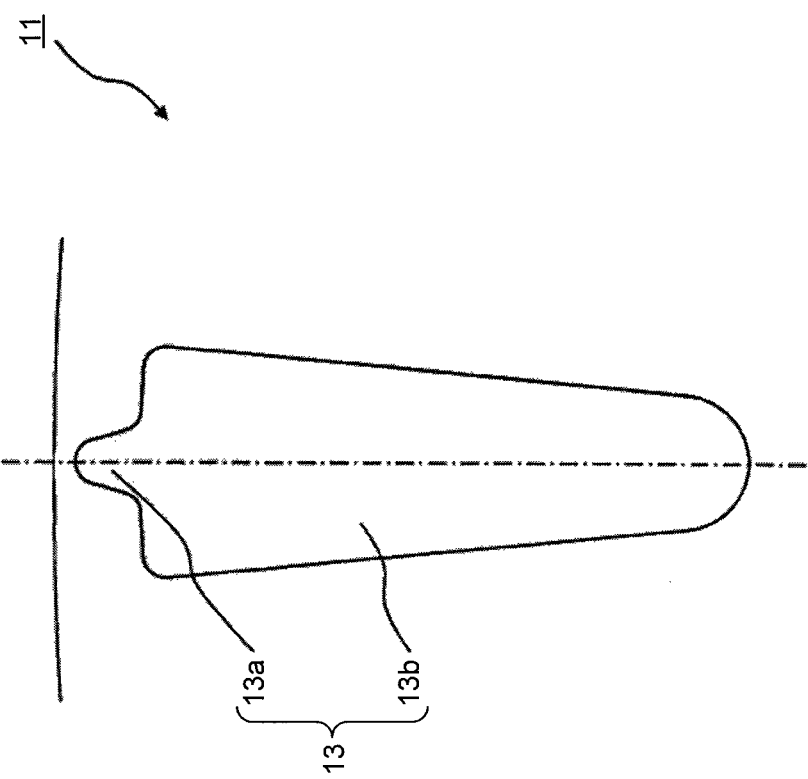
FIG. 19 depicts the first embodiment, and is an enlarged view of the rotor slot 13 according to the embodiment.

FIG. 19 depicts the first embodiment, and is an enlarged view of the rotor slot 13 according to the embodiment, and FIG. 20 is a partial enlarged view of FIG. 19. Although rounding of the rotor slot 13 is omitted in FIG. 16 so as to clearly define the dimensions of respective elements, respective corners of the rotor slot 13 are rounded in practice. An example of the embodiment the rotor slot 13 is described with reference to FIGS. 19 and 20.

As shown in FIG. 19, the corners of the rotor slot 13 are rounded. This is because corners of the metal mold used for blanking to produce the rotor iron core 11 are normally rounded.

Furthermore, dimensions of the respective elements are those as shown in FIG. 20.

Next, the efficiency of a compressor, an air blower, and the like can be improved by using the induction motor 100 that uses the rotor 10 according to the present embodiment in each of the compressor, the air blower, and the like. A compressor (specifically, a two-cylinder rotary compressor) in which the induction motor 100 using the rotor 10 according to the present embodiment is incorporated is described below.

Figure 21:
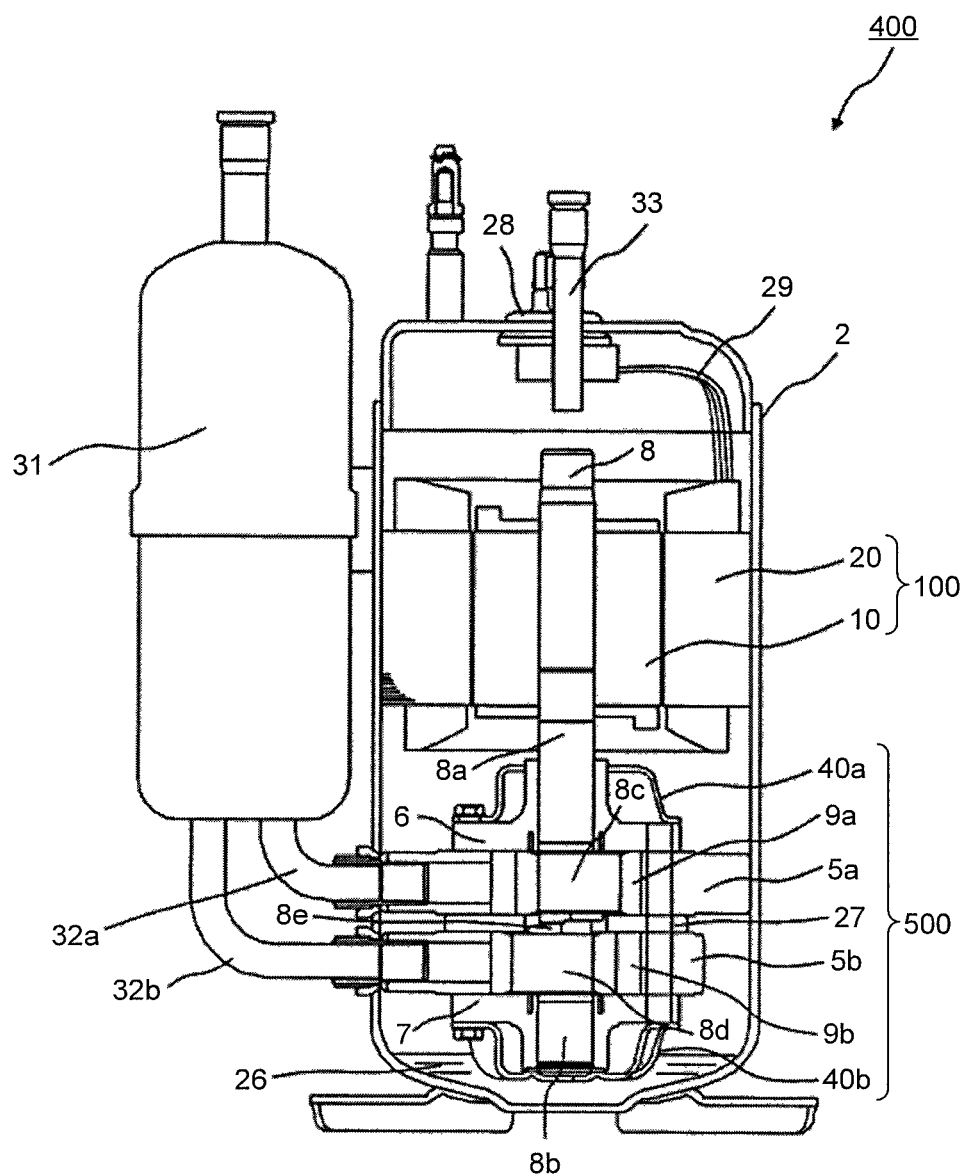
FIG. 21 depicts the first embodiment, and is a vertical cross-sectional view of a two-cylinder rotary compressor 400.

FIG. 21 depicts the first embodiment, and is a vertical cross-sectional view of a two-cylinder rotary compressor 400. A configuration of the two-cylinder rotary compressor 400 (an example of a hermetic compressor) is described with reference to FIG. 21. The two-cylinder rotary compressor 400 accommodates the induction motor 100 that is constituted by the stator 20 and the rotor 10 according to the present embodiment and a compression mechanical unit 500 that is driven by the induction motor 100 in a hermetic container 2 in a high-pressure atmosphere. The induction motor 100 is a single-phase induction motor.

As an example of the hermetic compressor, while the two-cylinder rotary compressor 400 is described here, a scroll compressor, a single-cylinder rotary compressor, a multistage rotary compressor, a swing rotary compressor, a vane compressor, a reciprocating compressor, and the like other than the two-cylinder rotary compressor can be used as the example of the hermetic compressor.

A turning force of the induction motor 100 is transmitted to the compression mechanical unit 500 via a main shaft 8a of a rotational shaft 8.

The rotational shaft 8 includes the main shaft 8a fixed to the rotor 10 of the induction motor 100, a secondary shaft 8b provided on a side opposite to the main shaft 8a, a main-shaft-side eccentric unit 8c and a secondary-shaft-side eccentric unit 8d formed by providing a predetermined phase difference (180°, for example) between the main shaft 8a and the secondary shaft 8b, and an intermediate shaft 8e provided between the main-shaft-side eccentric unit 8c and the secondary-shaft-side eccentric unit 8d.

A main bearing 6 is fitted into the main shaft 8a of the rotational shaft 8 with a clearance kept therebetween for sliding, and rotatably and pivotally supports the main shaft 8a.

A secondary bearing 7 is fitted into the secondary shaft 8b of the rotational shaft 8 with a clearance kept therebetween for sliding, and rotatably and pivotally supports the secondary shaft 8b.

The compression mechanical unit 500 includes a first cylinder 5a near the main shaft 8a and a second cylinder 5b near the secondary shaft 8b.

The first cylinder 5a has a cylindrical internal space, and a first piston 9a (a rolling piston) rotatably fitted into the main-shaft-side eccentric unit 8c of the rotational shaft 8 is provided in this internal space. A first vane (not shown) reciprocating in proportion to the rotation of the main-shaft-side eccentric unit 8c is also provided in the first cylinder 5a.

The first vane is accommodated in a vane groove of the first cylinder 5a and always pressed against the first piston 9a by a vane spring (not shown) provided in a back-pressure chamber. In the two-cylinder rotary compressor 400, an internal pressure of the hermetic container 2 is high. Accordingly, when the two-cylinder rotary compressor 400 starts operating, a force generated by a differential pressure between the high internal pressure of the hermetic container 2 and a pressure of a cylinder chamber acts on a rear surface (a back-pressure chamber side) of the vane. Therefore, the vane spring is mainly used to press the first vane against the first piston 9a at the time of starting the two-cylinder rotary compressor 400 (in a state of no difference between the internal pressure of the hermetic container 2 and the pressure of the cylinder chamber). The shape of the first vane is a flat and generally rectangular parallelepiped shape (the circumferential thickness is smaller than radial and axial lengths). A second vane (described later) is configured similarly to the first vane.

An intake port (not shown) through which inhaled gas from a refrigerating cycle passes penetrates the cylinder chamber from an outer circumferential surface of the first cylinder 5a. A discharge port (not shown) formed by cutting out neighborhoods of an edge of a circle (an end surface near the induction motor 100) forming the cylinder chamber that is a generally circular space is provided in the first cylinder 5a.

A compression chamber is formed by blocking both axial end surfaces of the internal space of the first cylinder 5a that accommodates the first piston 9a rotatably fitted into the main-shaft-side eccentric unit 8c of the rotational shaft 8 and the first vane with the main bearing 6 and a partition plate 27.

The first cylinder 5a is fixed to an inner circumferential portion of the hermetic container 2.

Similarly to the first cylinder 5a, the second cylinder 5b has a cylindrical internal space, and a second piston 9b (a rolling piston) rotatably fitted into the secondary-shaft-side eccentric unit 8d of the rotational shaft 8 is provided in this internal space. A second vane (not shown) reciprocating in proportion to the rotation of the secondary-shaft-side eccentric unit 8d is also provided in the second cylinder 5b. The first piston 9a and the second piston 9b are simply defined as "pistons".

Similarly to the first cylinder 5a, an intake port (not shown) through which the inhaled gas from the refrigerating cycle passes penetrates a cylinder chamber from an outer circumferential surface of the second cylinder 5b. A discharge port (not shown) formed by cutting out neighborhoods of an edge of a circle (an end surface opposite to the induction motor 100) forming the cylinder chamber that is a generally circular space is provided in the second cylinder 5b.

A compression chamber is formed by blocking both axial end surfaces of the internal space of the second cylinder 5b that accommodates the second piston 9b rotatably fitted into the secondary-shaft-side eccentric unit 8d of the rotational shaft 8 and the second vane with the secondary bearing 7 and the partition plate 27.

The compression mechanical unit 500 bolts the first cylinder 5a to the main bearing 6 and also the second cylinder 5b to the secondary bearing 7, and then axially and fixedly bolts the second cylinder 5b from outside of the main bearing 6 to the first cylinder 5a from outside of the secondary bearing 7 with the partition plate 27 held therebetween.

A discharge muffler 40a is attached to outside (a side of the induction motor 100) of the main bearing 6. High-temperature and high-pressure gas discharged from a discharge valve (not shown) provided on the main bearing 6 is put into one end of the discharge muffler 40a and then discharged from a discharge hole (not shown) of the discharge muffler 40a into the hermetic container 2.

A discharge muffler 40b is attached to outside (an opposite side to the induction motor 100) of the secondary bearing 7. High-temperature and high-pressure gas discharged from a discharge valve (not shown) provided on the secondary bearing 7 is put into one end of the discharge muffler 40b and then discharged from a discharge hole (not shown) of the discharge muffler 40b into the hermetic container 2.

An accumulator 31 is provided to be adjacent to the hermetic container 2. Suction tubes 32a and 32b communicate the first cylinder 5a and the second cylinder 5b with the accumulator 31, respectively.

Refrigerant gas compressed by the first cylinder 5a and the second cylinder 5b is discharged into the hermetic container 2 and fed out from a discharge tube 33 to a high pressure side of the refrigerating cycle.

Furthermore, power is supplied to the induction motor 100 via a lead 29 from a glass terminal 28.

Lubricating oil 26 (refrigerant oil) lubricating respective sliding units of the compression mechanical unit 500 is stored in a bottom portion within the hermetic container 2.

The lubricating oil is supplied to the respective sliding units of the compression mechanical unit 500 by raising the lubricating oil 26 stored in the bottom portion of the hermetic container 2 along an inside diameter of the rotational shaft 8 by a centrifugal force generated by the rotation of the rotational shaft 8 and supplying the lubricating oil 26 from an oil feeding hole (not shown) provided in the rotational shaft 8. The lubricating oil is supplied from the oil feeding hole to the sliding units between the main shaft 8a and the main bearing 6, between the main-shaft-side eccentric unit 8c and the first piston 9a, between the secondary-shaft-side eccentric unit 8d and the second piston 9b, and between the secondary shaft 8b and the secondary bearing 7, respectively.

The efficiency of the two-cylinder rotary compressor 400 configured as described above can be improved by using the induction motor 100 (a single-phase induction motor) that uses the rotor 10 according to the present embodiment.

Furthermore, although detailed explanations thereof are omitted, when the induction motor 100 (a single-phase induction motor) that uses the rotor 10 according to the present embodiment is used in, for example, an air blower besides the compressor, it is possible to improve the efficiency of the air blower.

Further, the efficiency of an air conditioner in which the compressor, the air blower, and the like are incorporated can be improved. An example of the air conditioner is described with reference to FIGS. 22 and 23.

Figure 22:
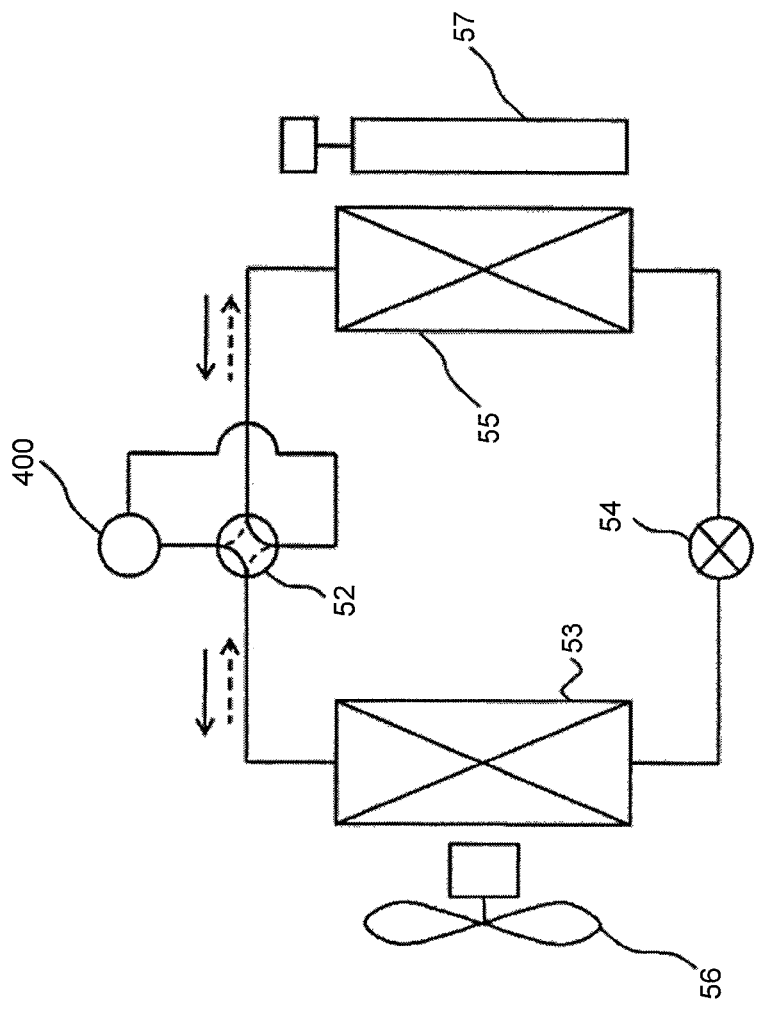
FIG. 22 depicts the first embodiment, and is a refrigerant circuit diagram of an air conditioner.
Figure 23:
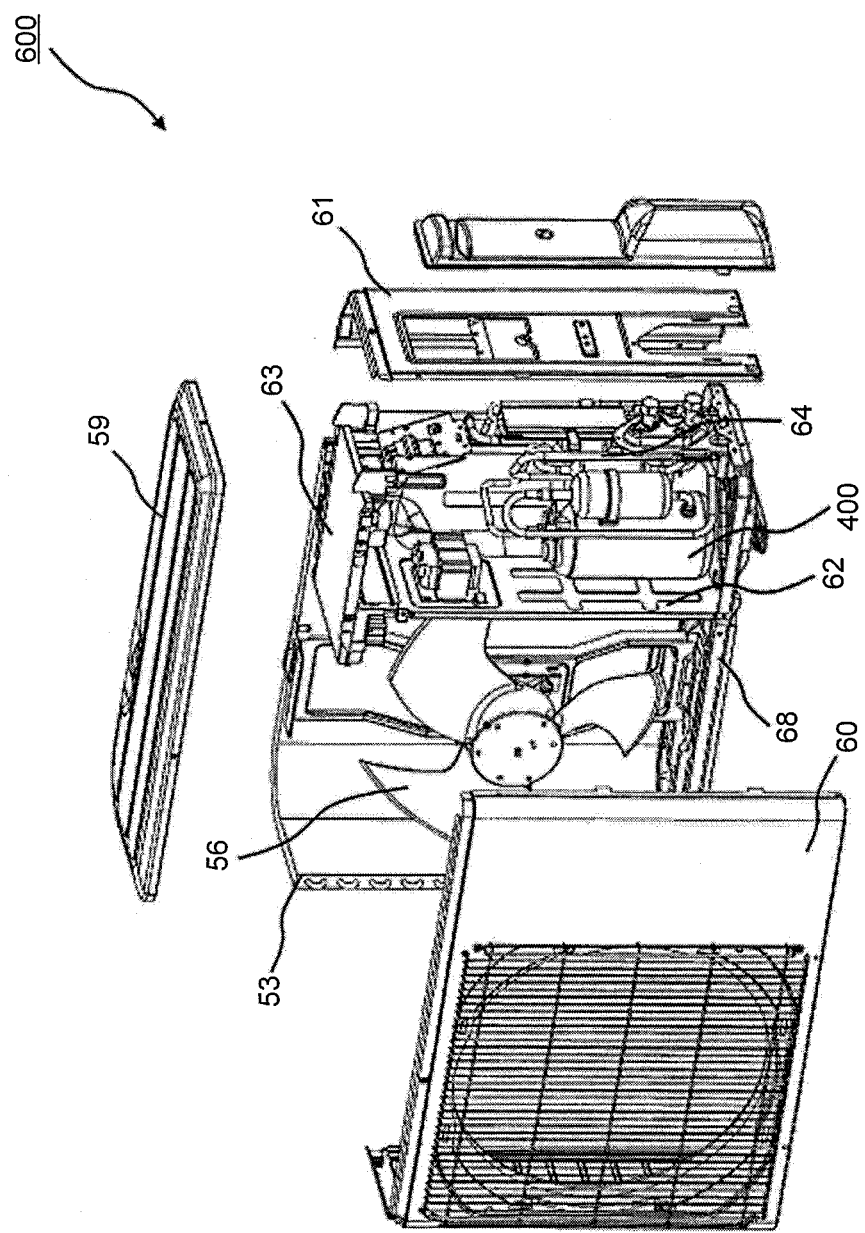
FIG. 23 depicts the first embodiment, and is an exploded perspective view of an outdoor unit 600 of the air conditioner.

FIGS. 22 and 23 depict the first embodiment, where FIG. 22 is a refrigerant circuit diagram of the air conditioner, and FIG. 23 is an exploded perspective view of an outdoor unit 600 of the air conditioner.

As shown in FIG. 22, the refrigerant circuit of the air conditioner constitutes the refrigerating cycle by sequentially connecting the two-cylinder rotary compressor 400 that compresses a refrigerant, a four-way valve 52 switching refrigerant flow directions between a cooling operation and a heating operation, an outdoor heat exchanger 53 that operates as a condenser during the cooling operation and as an evaporator during the heating operation, a decompression device 54 (an electronically controlled expansion valve) that decompresses a high-pressure liquid refrigerant into a low-pressure gas-liquid two-phase refrigerant, and an indoor heat exchanger 55 that operates as an evaporator during the cooling operation and as a condenser during the heating operation.

A solid arrow in FIG. 22 indicates a direction in which the refrigerant flows during the cooling operation. A dashed arrow in FIG. 22 indicates a direction in which the refrigerant flows during the heating operation.

An outdoor air blower 56 is provided on the outdoor heat exchanger 53, and an indoor air blower 57 (a cross flow fan) is provided on the indoor heat exchanger 55.

During the cooling operation, a compressed high-temperature and high-pressure refrigerant is discharged from the two-cylinder rotary compressor 400 and is put into the outdoor heat exchanger 53 via the four-way valve 52. In this outdoor heat exchanger 53, outside air blown by the outdoor air blower 56 provided on an air course of the outdoor heat exchanger 53 exchanges heat with the refrigerant while passing through between a fin and a tube (a heat exchange tube) of the outdoor heat exchanger 53, the refrigerant is cooled into a high-pressure liquefied state, and the outdoor heat exchanger 53 functions as the condenser. Thereafter, the liquefied refrigerant passes through the decompression device 54, where the refrigerant is decompressed into the low-pressure gas-liquid two-phase refrigerant, and the low-pressure gas-liquid two-phase refrigerant flows into the indoor heat exchanger 55. In the indoor heat exchanger 55, the indoor air blower 57 (a cross flow fan) attached on an air course of the indoor heat exchanger 55 drives indoor air to pass through between a fin and a tube (a heat exchange tube) of the indoor heat exchanger 55 and to exchange heat with the refrigerant, thereby cooling the air blown into an indoor space. On the other hand, the refrigerant receives the heat from the air and evaporates into a gaseous state (the indoor heat exchanger 5 functions as the evaporator), and the refrigerant then returns to the two-cylinder rotary compressor 400.

During the heating operation, the four-way valve 52 is reversed, whereby the refrigerant flows in a direction opposite to that of the flow of the refrigerant during the cooling operation in the refrigerating cycle, the indoor heat exchanger 55 functions as the condenser, and the outdoor heat exchanger 53 functions as the evaporator. The air heated by the indoor heat exchanger 55 controls (cools) the indoor space.

A configuration of the outdoor unit 600 of the air conditioner is described with reference to FIG. 23. The outdoor unit 600 of the air conditioner is configured to include the outdoor heat exchanger 53 having a generally L-shape in a plan view, a base plate 68 (a base) constituting a bottom of a housing of the outdoor unit 600, a flat top panel 59 constituting a top surface of the housing, a front panel 60 having a generally L-shape in a plan view and constituting a front surface and one side portion of the housing, a side panel 61 constituting the other side portion of the housing, a separator 62 separating the air course (an air blower chamber) from a machine chamber, an electric component box 63 in which electric components are contained, the two-cycle rotary compressor 400 that compresses the refrigerant, refrigerant-pipe/refrigerant-circuit components 64 for forming the refrigerant circuit, the outdoor air blower 56 blowing the air to the outdoor heat exchanger 53, and the like.

By incorporating the two-cylinder rotary compressor 400 according to the present embodiment and the outdoor air blower 56 (an air blower) using the induction motor 100 according to the present embodiment as a motor in the outdoor unit 600 of the air conditioner configured as described above, it becomes possible to improve the efficiency of the air conditioner.

The invention claimed is:

1. An induction motor comprising: a stator; a rotor that is provided inside of the stator via an air gap; and a squirrel-cage secondary conductor that is formed by filling a rotor slot of a rotor iron core of the rotor with a nonmagnetic and conductive material, wherein
the rotor slot includes
an outer circumferential slot that is formed near an outer circumference of the rotor, and
an inner circumferential slot that communicates with the outer circumferential slot and that is formed at a position radially inside of the outer circumferential slot,
the stator includes a stator iron core, and a winding that is inserted into a slot formed in the stator iron core,
the stator iron core includes
a core back that is formed near an outer circumference of the stator iron core,
a plurality of teeth that are formed to extend radially from an inner circumference of the core back in a direction of the rotor,
a slot that is formed between two of the adjacent teeth, and
a slot opening part that is formed in the slot, and that is open to the air gap, and wherein
when dimensions of respective elements of the rotor slot are defined as follows:
TB: a shortest distance between a center side of the inner circumferential slot, where the outer circumferential slot is formed, and the outer circumference of the rotor;
TC: a circumferential width of an innermost circumference of the outer circumferential slot;
TD: a circumferential width of an outermost circumference of the inner circumference slot; and
TE: a shortest distance between an end side of the inner circumferential slot and the outer circumference of the rotor, and when dimensions of respective elements of the stator iron core are defined as follows:
TF: a width of the teeth;
TG: a width of a teeth tip end; and
TH: a width of a slot opening part, the dimensions of the respective elements of the rotor slot and the dimensions of the respective elements of the stator iron core satisfy relations as follows;

$$TF/(TG+TH) \times TD/2 \leq TB \leq TD/2 \quad \text{Expression 1}$$

$$TF/(TG+TH) \times TD/2 \leq TE \leq TD/2 \quad \text{Expression 2.}$$

2. The induction motor according to claim 1, wherein
the circumferential width TC of the innermost circumference of the outer circumferential slot is smaller than the circumferential width TD of the outermost circumference of the inner circumferential slot, and
a circumferential width of the outer circumferential slot is smaller as the outer circumferential slot approaches to the outer circumference of the rotor.

3. The induction motor according to claim 1, wherein the circumferential width TC of the innermost circumference of the outer circumferential slot satisfies a relation of $1.5 \times T \leq TC$ with respect to a thickness T of a magnetic steel sheet that constitutes the rotor iron core.

4. The induction motor according to claim 1, wherein when it is assumed that the shortest distance between the center side of the inner circumferential slot and the outer circumference of the rotor is the TB, and that the shortest distance between the end side of the inner circumferential slot and the outer circumference of the rotor is the TE, the TB and the TE satisfy a relation of $TB \leq TE$.

5. The induction motor according to claim 1, wherein when it is assumed that the shortest distance between the outer circumferential slot and the outer circumference of the rotor is the TA, the TA is set to be smaller than a thickness T of a magnetic steel sheet that constitutes the rotor iron core.

6. A compressor comprising the induction motor according to claim 5.

7. An air blower comprising the induction motor according to claim 5.

8. An air conditioner comprising the air blower according to claim 7.

9. An air conditioner comprising the compressor according to claim 6.

* * * * *